United States Patent
Itokawa

(10) Patent No.: US 6,847,736 B2
(45) Date of Patent: Jan. 25, 2005

(54) IN IMAGE COMPRESSION, SELECTING FIELD OR FRAME DISCRETE WAVELET TRANSFORMATION BASED ON ENTROPY, POWER, OR VARIANCES FROM THE HIGH FREQUENCY SUBBANDS

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 09/816,453

(22) Filed: Mar. 26, 2001

(65) Prior Publication Data

US 2001/0031095 A1 Oct. 18, 2001

(30) Foreign Application Priority Data

Mar. 28, 2000 (JP) .................................... 2000-089303
Mar. 28, 2000 (JP) .................................... 2000-089305

(51) Int. Cl.[7] .............................................. G06K 9/36
(52) U.S. Cl. ................................ 382/240; 382/232
(58) Field of Search ................................ 382/232, 173, 382/240, 239, 233; 375/240.11, 240.19, 240.02

(56) References Cited

U.S. PATENT DOCUMENTS

| 5,091,782 A | * | 2/1992 | Krause et al. ............. 382/239 |
| 5,506,621 A | | 4/1996 | Ogasawara et al. ......... 348/396 |
| 5,604,539 A | | 2/1997 | Ogasawara et al. ......... 348/396 |
| 6,275,616 B1 | * | 8/2001 | Jahanghir et al. ........... 382/233 |
| 6,704,455 B1 | * | 3/2004 | Yamazaki et al. .......... 382/251 |

* cited by examiner

Primary Examiner—Yon J. Couso
(74) Attorney, Agent, or Firm—Fitzpatrick, Cella, Harper & Scinto

(57) ABSTRACT

A frame DWT unit makes subband segmentation of input moving image data in units of frames. Also, a field DWT unit makes subband segmentation of input moving image data in units of fields. First subbands obtained by the frame DWT unit undergo an arithmetic process, and a discrimination unit (104) determines based on a first arithmetic value obtained by the arithmetic process if the frame or field DWT unit is applied to the input moving image data.

19 Claims, 30 Drawing Sheets

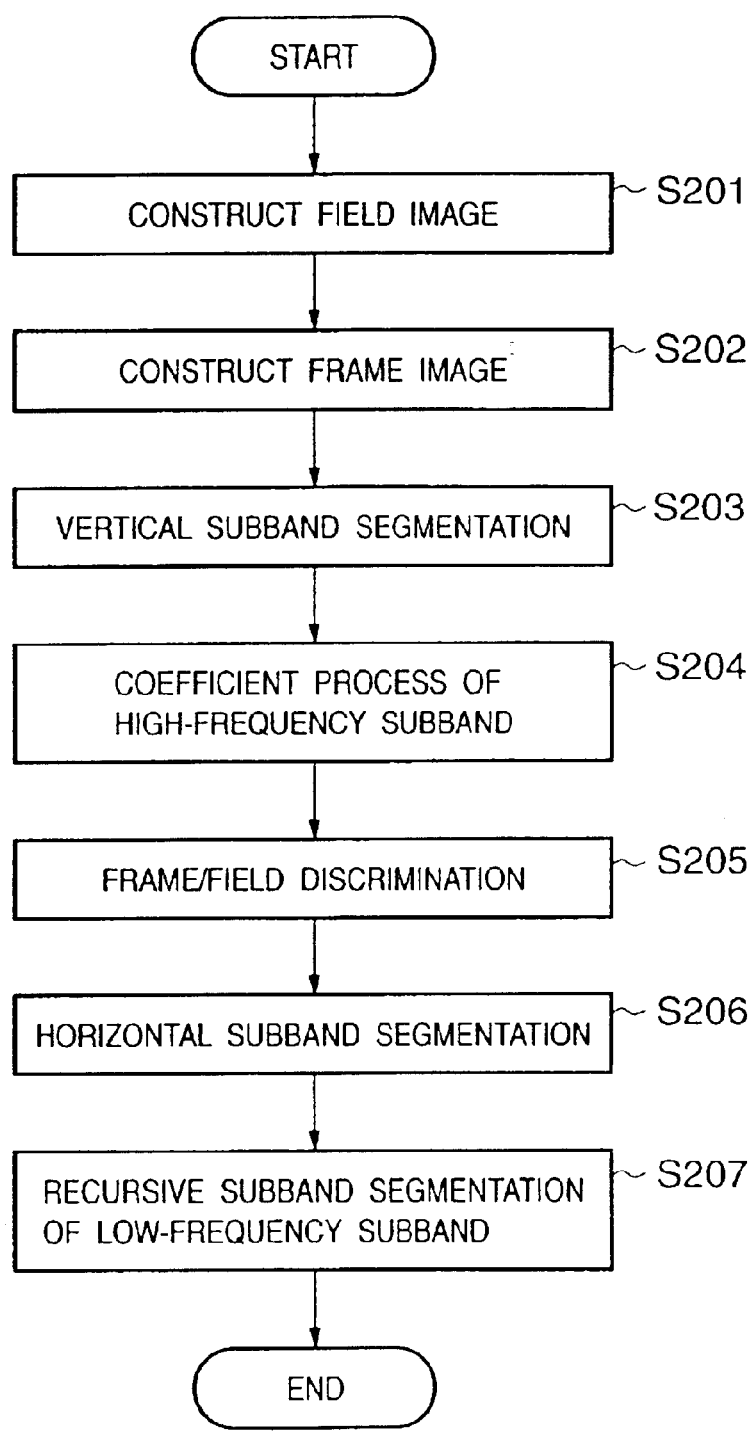

field1
field2 frame field1
field2 frame field1
field2 field1
field2 field1
field2 frame field1
field2 frame field1 field2 frame frame field1 field2 field1 field2 frame field1 field2

| IMAGE SIZE | TILE SIZE | NUMBER OF COMPONENTS | COMPONENT INFORMATION |

| TILE LENGTH | ENCODING PARAMETER |

Bit Plane S-1   Bit Plane S-2                    Bit Plane 0

| LL | HL2 | LH2 | LL | ... | LL | HL2 | LH2 | HH2 | HL1 | LH1 | HH1 |

PRIOR ART
PRIOR ART
F I G. 24A
F I G. 24B
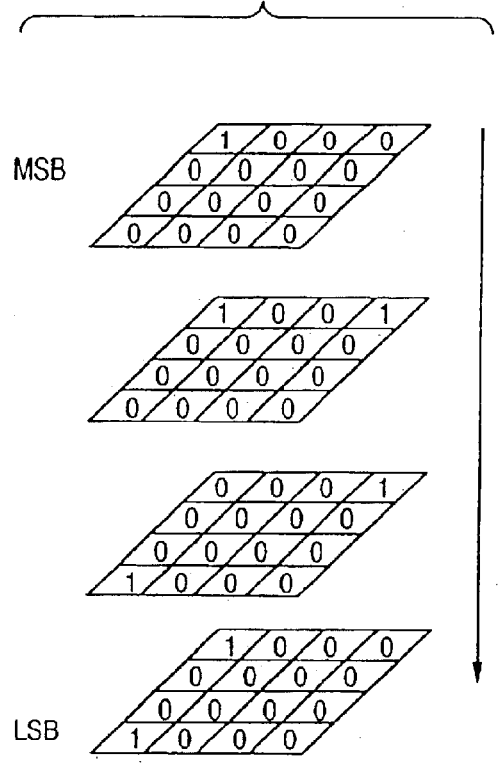
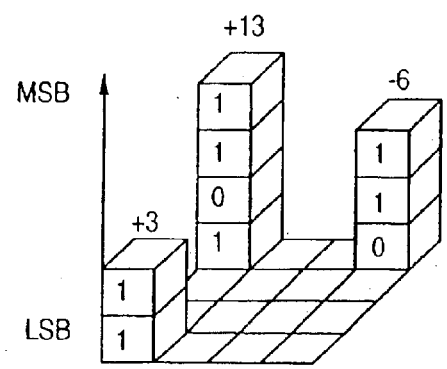

PRIOR ART  FIG. 27A
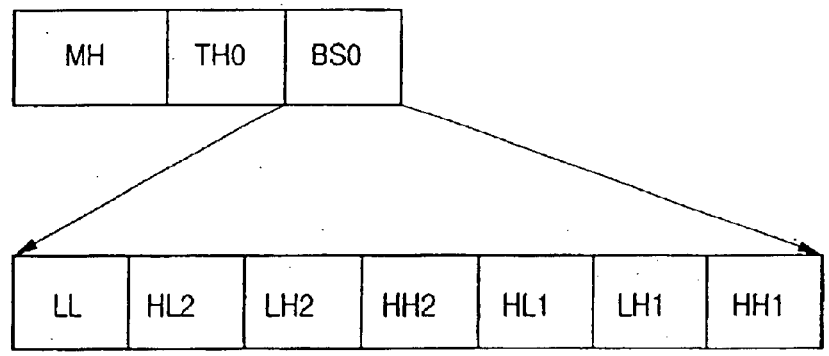
PRIOR ART  FIG. 27B
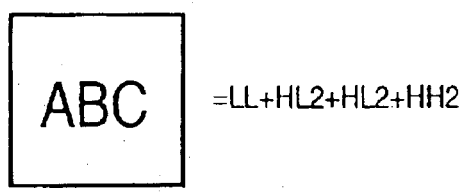
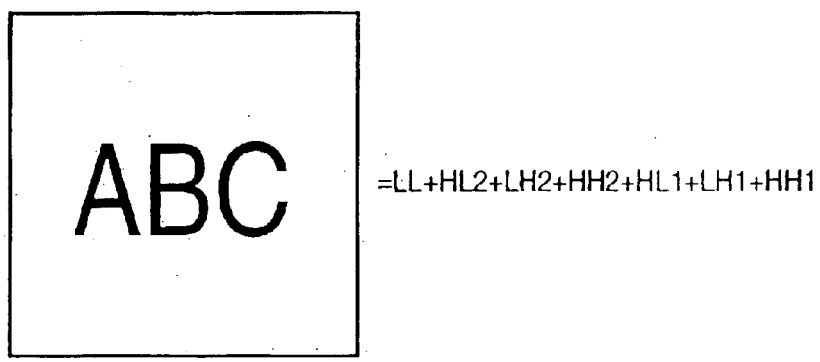

field1  field2

IN IMAGE COMPRESSION, SELECTING FIELD OR FRAME DISCRETE WAVELET TRANSFORMATION BASED ON ENTROPY, POWER, OR VARIANCES FROM THE HIGH FREQUENCY SUBBANDS

FIELD OF THE INVENTION

The present invention relates to an image processing apparatus and method for encoding/decoding a moving image, and a computer readable memory.

BACKGROUND OF THE INVENTION

As a color still image encoding scheme, JPEG as the international standard is prevalent. As a method of realizing higher compression ratio than JPEG, a new encoding method based on wavelet transformation is being standardized.

As the processing speed of a CPU increases, a moving image can be encoded by continuously encoding using an image encoding apparatus that adopts the aforementioned encoding scheme. A moving image input scheme to the image encoding apparatus includes progressive scan for sequentially scanning an image in units of lines from the upper left corner toward the lower right corner of a frame, and interlaced scanning for scanning an image in two scans, i.e., odd and even lines by interlacing lines.

However, since the encoding scheme used in conventional still image encoding adopts progressive scanning, if a moving image input by interlaced scanning is directly applied to still image encoding, the coding efficiency drops considerably.

An example of such case will be described in detail below.

In interlaced scanning, the scan frequency is doubled while halving the number of pixels by scanning an image every other line. FIG. 29 is an explanatory view showing this timing. If the frame period of progressive scanning is $\frac{1}{30}$ sec, that of interlaced scanning is $\frac{1}{60}$ sec.

When a moving image input by interlaced scanning is processed as that in the progressive format, two field images are processed as one frame image. The number of pixels processed per frame period is the same in both the scanning schemes.

FIGS. 30A to 30C are views for explaining the state wherein an image in which a vertical line with a given width moves from the right to the left on the screen is captured.

FIG. 30A shows an image captured at the frame period. FIG. 30B shows images captured at the field period. FIG. 30C shows an image obtained by displaying the images shown in FIG. 30B at the frame period. Since the capture timings of the images shown in FIG. 30B have a time difference, the displayed image shown in FIG. 30C deviates in the horizontal direction. This deviation contains high-frequency components when viewed from the vertical direction. As a general feature of a natural image, many coefficients are contained in a low-frequency range when the image is broken up into subbands. For this reason, the low-frequency range is broken up into subbands again in FIG. 30C. However, an interlaced image also contains many components in a high-frequency range, as described in the example shown in FIGS. 30A to 30C.

When many coefficients which are naturally concentrated in LL appear in HL, or when an original signal contains high-frequency components in the horizontal direction, many coefficients appear in both LL and HL. Under the influence of interlaced scanning, more coefficients appear in LH and HH, thus considerably impairing the efficiency of subsequent entropy encoding.

When an image does not move in the horizontal direction within $\frac{1}{60}$ sec, since high correlation is found in the vertical direction, high encoding efficiency can be obtained by encoding in units of frames as in conventional still image encoding.

In order to efficiently encode an interlaced moving image, a process in units of frames and that in units of fields are preferably combined.

SUMMARY OF THE INVENTION

The present invention has been made in consideration of the aforementioned problems, and has as its object to provide an image processing apparatus and method that can efficiently and satisfactorily encode/decode a moving image, and a computer readable memory.

In order to achieve the above object, an image processing apparatus according to the present invention comprises the following arrangement.

That is, an image processing apparatus for encoding input moving image data, comprises:

first segmentation means for making subband segmentation of the input moving image data into in units of frames using wavelet transformation;

second segmentation means for making subband segmentation of the input moving image data in units of fields using wavelet transformation;

arithmetic means for making an arithmetic process of first subbands obtained by the first segmentation means; and discrimination means for discriminating based on a first arithmetic value obtained by the arithmetic means if the first or second segmentation means is applied to the input moving image data.

Preferably, the arithmetic means also makes the arithmetic process for second subbands obtained by the second segmentation means to output a second arithmetic value.

Preferably, the discrimination means discriminates based on the first and second arithmetic values if the first or second segmentation means is applied to the input moving image data.

Preferably, the discrimination means discriminates based on a comparison result between the first arithmetic value and a predetermined value if the first or second segmentation means is applied to the input moving image data.

Preferably, a discrimination result of the discrimination means is generated as identification information.

Preferably, the arithmetic means makes the arithmetic process of a high-frequency subband obtained after the input moving image data has undergone vertical subband segmentation.

Preferably, the arithmetic means makes the arithmetic process of a high-frequency subband obtained after the input moving image data has undergone vertical subband segmentation and horizontal subband segmentation.

Preferably, the arithmetic means makes the arithmetic process for computing one of an entropy, signal power, and variance of the subband.

Preferably, when the discrimination means determines that the second segmentation means is applied, vertical subband segmentation by the second segmentation means uses data obtained after the first segmentation means executes horizontal subband segmentation of the input moving image data.

In order to achieve the above object, an image processing apparatus according to the present invention comprises the following arrangement.

That is, an image processing apparatus for decoding encoded moving image data, comprises:

decoding means for decoding encoded data which contains identification information indicating a process in units of frames or fields, and is obtained by encoding at least subband segmented data;

first synthesis means for making subband synthesis in units of frames using wavelet transformation for decoded data decoded by the decoding means;

second synthesis means for making subband synthesis in units of fields using wavelet transformation for decoded data decoded by the decoding means; and discrimination means for discriminating based on the identification information contained in the decoded data decoded by the decoding means if the first or second synthesis means is applied to the decoded data.

Preferably, the decoded data consists of predetermined unit decoded data groups, and the identification information is included in each predetermined unit decoded data group.

In order to achieve the above object, an image processing method according to the present invention comprises the following arrangement.

That is, an image processing method for encoding input moving image data, comprises:

the first segmentation step of making subband segmentation of the input moving image data in units of frames using wavelet transformation;

the second segmentation step of making subband segmentation of the input moving image data in units of fields using wavelet transformation;

the arithmetic step of making an arithmetic process of first subbands obtained in the first segmentation step; and the discrimination step of discriminating based on a first arithmetic value obtained in the arithmetic step if the first or second segmentation step is applied to the input moving image data.

In order to achieve the above object, an image processing method according to the present invention comprises the following arrangement.

That is, an image processing method for decoding moving image data encoded using wavelet transformation, comprises:

the decoding step of decoding encoded data which contains identification information indicating a process in units of frames or fields, and is obtained by encoding at least subband segmented data;

the first synthesis step of making subband synthesis in units of frames for decoded data decoded in the decoding step;

the second synthesis step of making subband synthesis in units of fields for decoded data decoded in the decoding step; and the discrimination step of discriminating based on the identification information contained in the decoded data decoded in the decoding step if the first or second synthesis step is applied to the decoded data.

In order to achieve the above object, a computer readable memory according to the present invention comprises the following arrangement.

That is, a computer readable memory that stores a program code of an image process for encoding input moving image data, comprises:

a program code of the first segmentation step of making subband segmentation of the input moving image data in units of frames using wavelet transformation;

a program code of the second segmentation step of making subband segmentation of the input moving image data in units of fields using wavelet transformation;

a program code of the arithmetic step of making an arithmetic process of first subbands obtained in the first segmentation step; and a program code of the discrimination step of discriminating based on a first arithmetic value obtained in the arithmetic step if the first or second segmentation step is applied to the input moving image data.

In order to achieve the above object, a computer readable memory according to the present invention comprises the following arrangement.

That is, a computer readable memory that stores a program code of an image process for decoding moving image data encoded using wavelet transformation, comprises:

a program code of the decoding step of decoding encoded data which contains identification information indicating a process in units of frames or fields, and is obtained by encoding at least subband segmented data;

a program code of the first synthesis step of making subband synthesis in units of frames for decoded data decoded in the decoding step;

a program code of the second synthesis step of making subband synthesis in units of fields for decoded data decoded in the decoding step; and a program code of the discrimination step of discriminating based on the identification information contained in the decoded data decoded in the decoding step if the first or second synthesis step is applied to the decoded data.

In order to achieve the above object, an image processing apparatus according to the present invention comprises the following arrangement.

That is, an image processing apparatus for encoding input moving image data, comprises:

first segmentation means for making horizontal subband segmentation of the moving image data using wavelet transformation;

discrimination means for discriminating a type of subband segmentation to be applied to the moving image data on the basis of subbands obtained by the first segmentation means; and second segmentation means for making subband segmentation of the moving image data in units of frames or fields using wavelet transformation on the basis of a discrimination result of the discrimination means.

Preferably, the discrimination means discriminates the type of subband segmentation applied to the moving image data on the basis of a low-frequency subband of the subbands obtained by the first segmentation means.

Preferably, the discrimination means computes a sum of absolute values of differences between pixels which form the low-frequency subband, and discriminates the type of subband segmentation applied to the moving image data on the basis of the computed value.

Preferably, the discrimination means discriminates the type of subband segmentation applied to the moving image data on the basis of pixels obtained by decimating pixels which form the low-frequency subbands in one or both of horizontal and vertical directions.

Preferably, the discrimination means recursively makes horizontal subband segmentation of the low-frequency subband, and discriminates the type of subband segmentation applied to the moving image data on the basis of a final low-frequency subband.

Preferably, the apparatus further comprises encoding means for generating encoded data containing subbands obtained by the second segmentation means, and identification information indicating a discrimination result of the discrimination means.

In order to achieve the above object, an image processing method according to the present invention comprises the following arrangement.

That is, an image processing method for encoding input moving image data, comprises:

the first segmentation step of making horizontal subband segmentation of the moving image data using wavelet transformation;

the discrimination step of discriminating a type of subband segmentation to be applied to the moving image data on the basis of subbands obtained in the first segmentation step; and the second segmentation step of making subband segmentation of the moving image data in units of frames or fields using wavelet transformation on the basis of a discrimination result in the discrimination step.

In order to achieve the above object, a computer readable memory according to the present invention comprises the following arrangement.

That is, a computer readable memory that stores a program code of an image process for encoding input moving image data, comprises:

a program code of the first segmentation step of making horizontal subband segmentation of the moving image data using wavelet transformation;

a program code of the discrimination step of discriminating a type of subband segmentation to be applied to the moving image data on the basis of subbands obtained in the first segmentation step; and a program code of the second segmentation step of making subband segmentation of the moving image data in units of frames or fields using wavelet transformation on the basis of a discrimination result in the discrimination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a flow chart showing processes executed, by the image encoding apparatus of the first embodiment;

FIGS. 24A and 24B are views for explaining the operation of an entropy decoder;

FIGS. 27A and 27B show the display pattern of an image upon reclaiming and displaying an image;

DESCRIPTION OF THE PREFERRED EMBODIMENTS

Conventional encoding/decoding based on wavelet transformation will be explained first.

(Image Encoding Apparatus)

Figure 16:
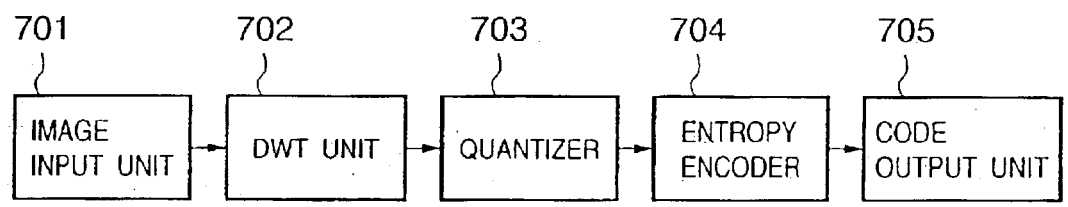
FIG. 16 is a block diagram showing the arrangement of a conventional image encoding apparatus.

FIG. 16 is a block diagram showing the arrangement of a conventional image encoding apparatus.

Referring to FIG. 16, reference numeral 701 denotes an image input unit; 702, a discrete wavelet transformation unit; 703, a quantizer; 704, an entropy encoder; and 705, a code output unit.

The image input unit 701 receives pixel signals that form an image to be encoded in the raster scan order. The input image signal is input to the discrete wavelet transformation unit 702. In the following description, an image signal represents a monochrome multi-valued image. However, when a plurality of color components of a color image or the like are to be encoded, each of R, G, and B color components or a luminance component and chromaticity components can be independently compressed in the same manner as described above.

The discrete wavelet transformation (DWT) unit 702 executes a two-dimensional wavelet transformation process for the input image data, and computes and outputs transform coefficients. The basic arrangement of the discrete wavelet transformation unit 702 will be described below using FIG. 17.

Figure 17:
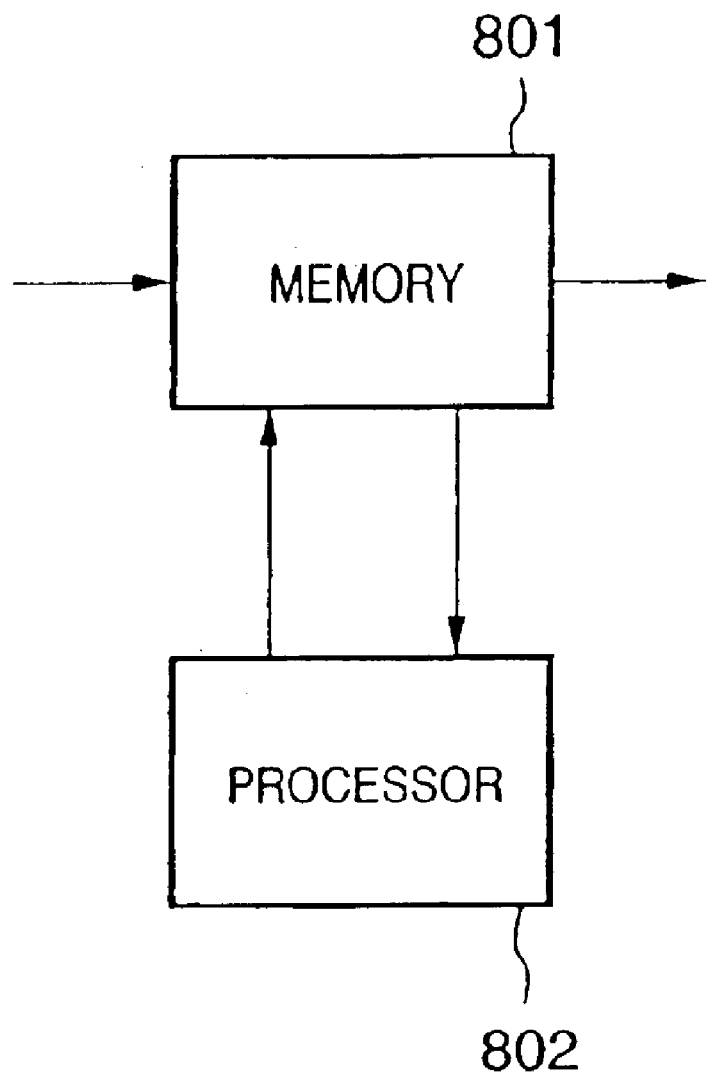
FIG. 17 is a block diagram showing the basic arrangement of a discrete wavelet transformation unit.

FIG. 17 shows the basic arrangement of the discrete wavelet transformation unit.

Referring to FIG. 17, an input image signal is stored in a memory 801, is sequentially read out by a processor 802 to undergo the transformation process, and is written in the memory 801 again.

Figure 18:
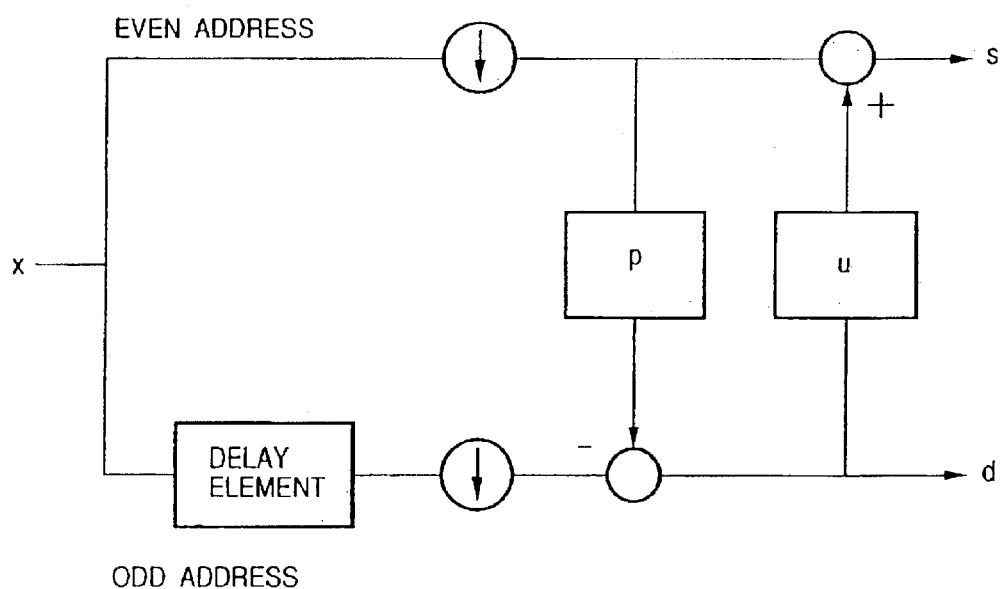
FIG. 18 is a block diagram showing the detailed arrangement of a processor.

The detailed arrangement of the processor 802 will be explained below using FIG. 18. FIG. 18 shows the detailed arrangement of the processor.

Referring to FIG. 18, an input image signal x is separated into odd and even address signals by a combination of a delay element and down samplers, and these signals undergo filter processes of two filters p and u. In FIG. 18, s and d represent low- and high-pass coefficients upon decomposing a linear image signal to one level, and are respectively computed by:

$$d(n)=x(2*n+1)-\text{floor}((x(2*n)+x(2*n+2))/2) \quad (1)$$

$$s(n)=x(2*n)+\text{floor}((d(n-1)+d(n))/4) \quad (2)$$

where x(n) is an image signal to be transformed, and floor(x) indicates a maximum integer smaller than x.

With the aforementioned process, a linear discrete wavelet transformation process is done for the image signal.

Two-dimensional discrete wavelet transformation is implemented by sequentially executing linear transformation in the horizontal and vertical directions of an image. Since details of this process are known to those who are skilled in the art, a description thereof will be omitted.

Transform coefficient groups of two levels obtained by the two-dimensional discrete wavelet transformation will be described below using FIG. 19.

Figure 19:
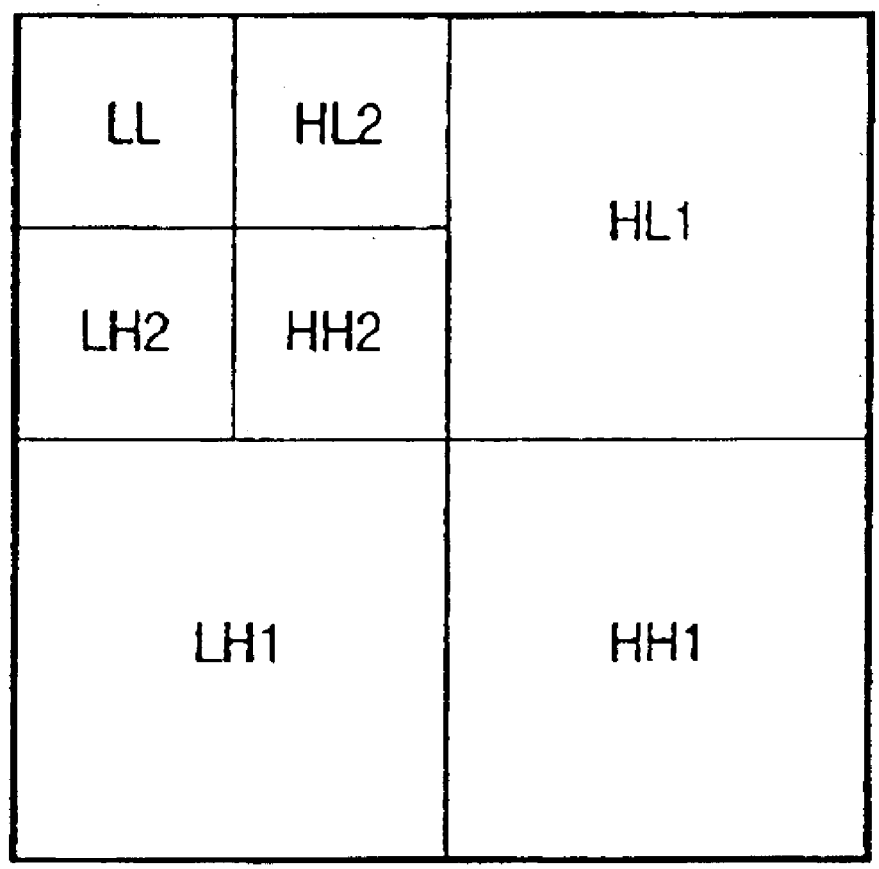
FIG. 19 shows an example of the configuration of transform coefficient groups of two levels.

FIG. 19 shows an example of the format of transform coefficient groups of two levels.

An image signal is decomposed into coefficient sequences HH1, HL1, LH1, ..., and LL in different frequency bands. Note that these coefficient sequences will be referred to as subbands hereinafter. The coefficient data of the individual subbands are output to the quantizer 703.

The description will revert to FIG. 16.

The quantizer 703 quantizes the input coefficient data by a predetermined quantization coefficient A, and outputs indices corresponding to the quantized values to the entropy encoder 704. In this case, quantization is described by:

$$q=\text{sign}(c)\text{floor}(abs(c)/\Delta) \quad (3)$$

$$\text{sign}(c)=1;\ c>=0 \quad (4)$$

$$\text{sign}(c)=-1;\ c<0 \quad (5)$$

where c is a coefficient to be quantized. The value Δ includes "1". In this case, no quantization is done in practice, and subbands input to the quantizer 703 are directly output to the entropy encoder 704.

The entropy encoder 704 decomposes the input quantization indices into bit planes, executes binary arithmetic coding in units of bit planes, and outputs a code stream. The operation of the entropy encoder 704 will be explained below using FIGS. 20A and 20B.

Figure 20A:
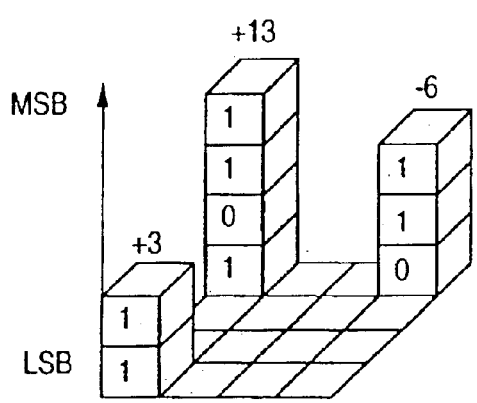
FIGS. 20A and 20B are views for explaining the operation of an entropy encoder.
Figure 20B:
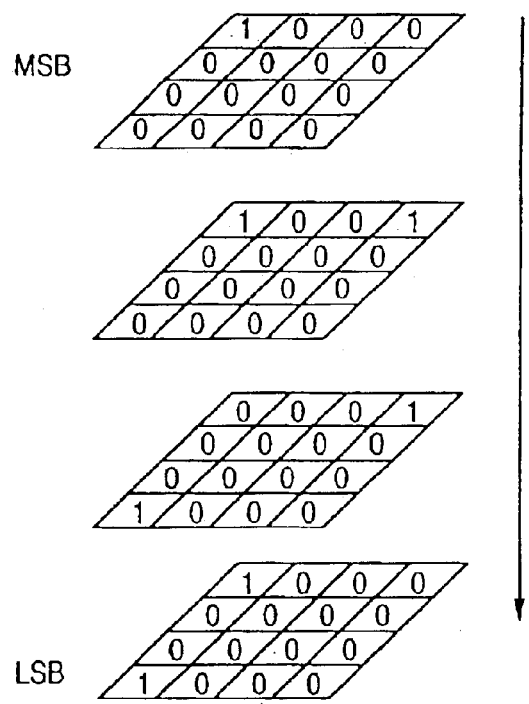

FIGS. 20A and 20B are views for explaining the operation of the entropy encoder.

In this example, a 4×4 subband region includes three nonzero quantization indices, which respectively have values "+13", "−6", and "+3". The entropy encoder 704 scans this region to obtain a maximum value M, and computes the number S of bits required for expressing the maximum quantization index by:

$$S=\text{ceil}(\log 2(abs(M))) \quad (6)$$

where ceil(x) is the smallest one of integers equal to or larger than x.

In FIG. 20A, since the maximum value is "13", equation (6) yields S=4. Hence, 16 quantization indices in the sequence are processed in units of four bit planes, as shown in FIG. 20B. The entropy encoder 704 makes binary arithmetic coding of bits of the most significant bit plane (indicated by MSB in FIG. 20B) first, and outputs the coding result as a bitstream.

Then, the encoder 704 lowers the bit plane by one level, and encodes and outputs bits of each bit plane to the code output unit 705 until the bit plane of interest reaches the least significant bit plane (indicated by LSB in FIG. 20B). At this time, a code of each quantization index is entropy-encoded immediately after the first nonzero bit is detected upon scanning the bit plane.

The format of a code sequence output to the code output unit 705 will be described below using FIGS. 21A to 21D.

FIGS. 21A to 21D show the format of a code sequence output to the code output unit.

Figure 21A:
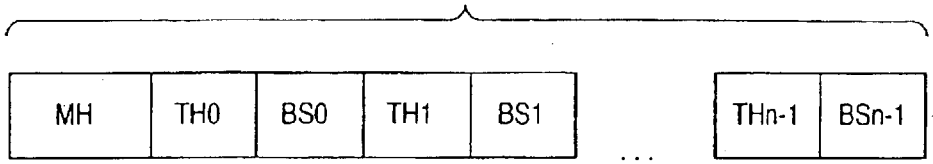
FIGS. 21A to 21D are views for explaining the format of a code sequence output to a code output unit.
Figure 21B:
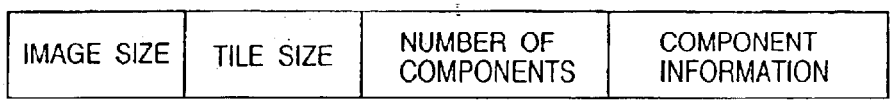

FIG. 21A shows the overall format of a code sequence, in which MH is a main header; TH, a tile header; and BS, a bitstream. FIG. 21B shows the format of the main header TH. The main header MH is comprised of the size (the numbers of pixels in the horizontal and vertical directions) of an image to be encoded, a size upon breaking up the image into tiles as a plurality of rectangular regions, the number of components indicating the number of color components, the size of each component, and component information indicating bit precision. When an image is not broken up into tiles, the tile size is equal to the image size, and when the image to be encoded is a monochrome multi-valued image, the number of components is "1".

Figure 21C:
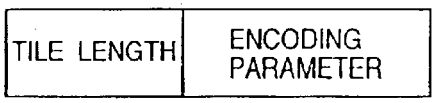

FIG. 21C shows the format of the tile header TH. The tile header TH consists of a tile length including the bitstream length and header length of the tile of interest, and an encoding parameter for the tile of interest. The encoding parameter includes a discrete wavelet transform level, filter type, and the like.

Figure 21D:
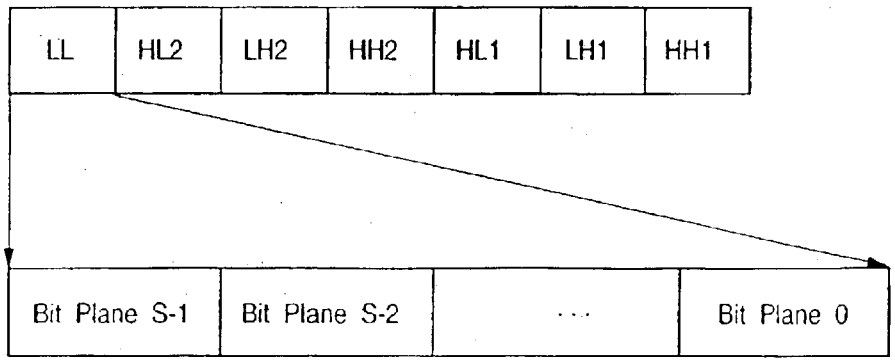

FIG. 21D shows the format of the bitstream BS. The bitstream is formed in units of subbands, which are arranged in turn from a subband having a low resolution in ascending order of resolution. Furthermore, in each subband, codes are set in units of bit planes, i.e., in the order from an upper bit plane to a lower bit plane.

With this code sequence, hierarchical decoding shown in FIGS. 27A and 27B (to be described later) can be done.

The code sequence may have the format shown in FIGS. 22A to 22D.

FIGS. 22A to 22D are views showing another format of a code sequence output to the code output unit.

Figures 22A, 22B, 22C, 22D:
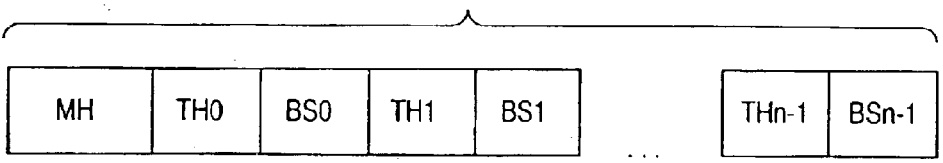
FIGS. 22A to 22D are views showing another format of a code sequence output to the code output unit.

FIG. 22A shows the overall format of a code sequence, in which MH is a main header; TH, a tile header; and BS, a bitstream. FIG. 22B shows the format of the main header MH. The main header MH is comprised of the size (the numbers of pixels in the horizontal and vertical directions) of an image to be encoded, a size upon breaking up the image into tiles as a plurality of rectangular regions, the number of components indicating the number of color components, the size of each component, and component information indicating bit precision. When an image is not broken up into tiles, the tile size is equal to the image size, and when the image to be encoded is a monochrome multi-valued image, the number of components is "1".

FIG. 22C shows the format of the tile header TH. The tile header TH consists of a tile length including the bitstream length and header length of the tile of interest, and an encoding parameter for the tile of interest. The encoding parameter includes a discrete wavelet transform level, filter type, and the like.

FIG. 22D shows the format of the bitstream BS. The bitstream is formed in units of bit planes, which are set in the order from an upper bit plane to a lower bit plane. In the bit planes, the encoding results of the bit planes of a given quantization index in each subband are sequentially set in units of subbands.

With this code sequence, hierarchical decoding shown in FIGS. 28A and 28B (to be described later) can be done.

In the aforementioned process, the compression ratio of the entire image to be encoded can be controlled by changing the quantization step A.

Lower bits of a bit plane to be encoded by the entropy encoder 704 can be limited (discarded) in correspondence with a required compression ratio. In this case, not all bit planes are not encoded, but bit planes from the most significant bit plane to a bit plane corresponding in number to the required compression ratio are encoded and are included in a final code sequence.

(Image Decoding Apparatus)

Figure 23:
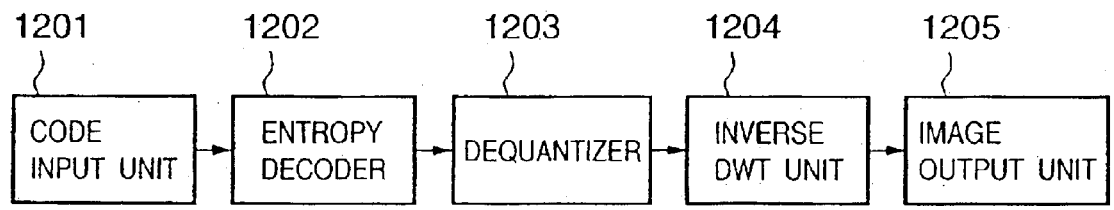
FIG. 23 is a block diagram showing the arrangement of a conventional image decoding apparatus.

FIG. 23 is a block diagram showing the arrangement of a conventional image decoding apparatus.

Referring to FIG. 23, reference numeral 1201 denotes a code input unit; 1202, an entropy decoder; 1203, a dequantizer; 1204, an inverse discrete wavelet transformation unit; and 1205, an image output unit.

The code input unit 1201 receives a code sequence, analyzes the header included in that sequence to extract parameters required for the subsequent processes, and controls the flow of processes if necessary or outputs required parameters to the subsequent processing units. The bitstreams included in the input code sequence are output to the entropy decoder 1202.

The entropy decoder 1202 decodes and outputs the bitstreams in units of bit planes. The operation of the entropy decoder 1202 will be described below using FIGS. 24A and 24B.

FIG. 24A illustrates the flow for sequentially decoding one subband region to be decoded in units of bit planes to finally restore a quantization index, and bit planes are decoded in the order of an arrow in FIG. 24A. In this case, the process is done, as shown in FIG. 24B. The restored quantization indices are output to dequantizer 1203.

The dequantizer 1203 reclaims discrete wavelet transform coefficients from the input quantization indices by:

$$c' = \Delta * q; \quad q \neq 0 \quad (7)$$

$$c' = 0; \quad q = 0 \quad (8)$$

where q is the quantization index, and $\Delta$ is the quantization step, which is the same value used upon encoding. c' is the restored subband, which is obtained by restoring a coefficient s or d in encoding. This subband c' is output to the inverse discrete wavelet transformation (inverse DWT) unit 1204. The basic arrangement of the inverse discrete wavelet transformation unit 1204 will be described below using FIG. 25.

Figure 25:
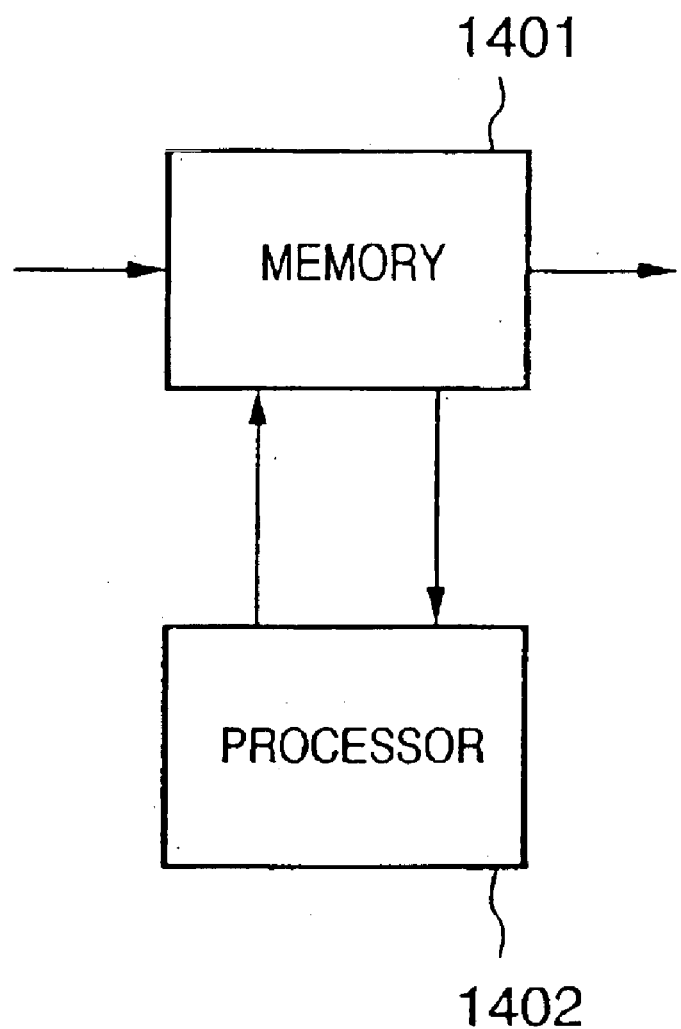
FIG. 25 is a block diagram showing the basic arrangement of an inverse discrete wavelet transformation unit.

FIG. 25 shows the basic arrangement of the inverse discrete wavelet transformation unit.

Referring to FIG. 25, the input subbands are stored in a memory 1401. A processor 1402 executes a linear inverse discrete wavelet transform process for the subbands stored in the memory 1401 and implements a two-dimensional inverse discrete wavelet transform process by sequentially reading out coefficients from the memory 1401. The two-dimensional inverse discrete wavelet transform process is executed in a sequence opposite to the forward transform, but since its details are known to those who are skilled in the art, a description thereof will be omitted.

The detailed arrangement of the processor 1402 will be described below using FIG. 26.

Figure 26:
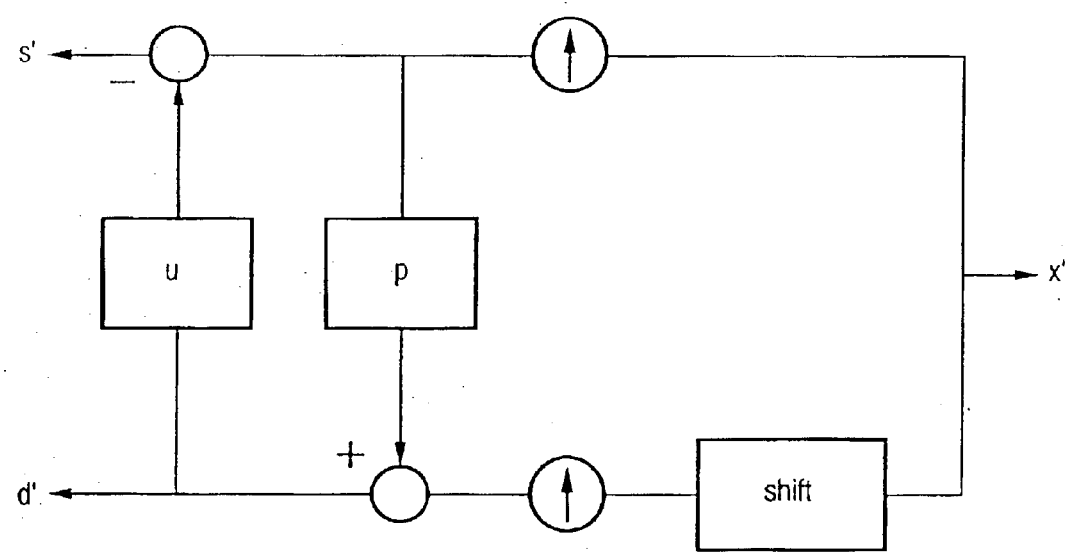
FIG. 26 is a block diagram showing the detailed arrangement of a processor.

FIG. 26 shows the detailed arrangement of the processor.

In FIG. 26, s' and d' are low- and high-pass coefficients upon decomposing a linear image signal to one level, and respectively correspond to even and odd addresses. The subbands undergo two filter processes of filters u and p. The processed subbands are added by up samplers, thus outputting an image signal x'. These processes are described by:

$$x'(2*n) = s'(n) - \mathrm{floor}((d'(n-1) + d'(n))/4) \quad (9)$$

$$x'(2*n+1) = d'(n) + \mathrm{floor}((x'(2*n) + x'(2*n+2))/2) \quad (10)$$

Since the forward and inverse discrete wavelet transform processes given by equations (1), (2), (9), and (10) satisfy a perfect reconstruction condition, the restored image signal x' matches the original image signal x as long as the quantization step $\Delta$ is "1" and all bit planes are decoded in bit plane decoding.

With the aforementioned process, an image signal is reclaimed and is output to the image output unit 1205. Note that the image output unit 1205 may be an image display device such as a monitor or the like, or may be a storage device such as a magnetic disk or the like.

The image display pattern upon restoring and displaying an image in the aforementioned sequence will be explained using FIGS. 27A and 27B.

FIGS. 27A and 27B show the image display pattern upon restoring and displaying an image.

FIG. 27A shows an example of a code sequence, the basic format of which is based on FIGS. 21A to 21D. In this case, the entire image is set as a tile and, hence, the code sequence includes only one tile header and bitstream. In this bitstream BS0, codes are set in turn from LL as a subband corresponding to the lowest resolution in ascending order of resolution.

The image decoding apparatus sequentially reads this bitstream, and displays an image upon completion of decoding of codes of each bit plane. FIG. 27B shows the respective subbands, and the sizes of images to be displayed. In this example, two levels of two-dimensional discrete wavelet transformation processes are done, and when LL alone is decoded and displayed, an image, the numbers of pixels of which are reduced to ¼ in the horizontal and vertical directions with respect to an original image, is restored. When another bitstream is read and all subbands of level 2 are decoded and displayed, an image, the numbers of pixels of which are reduced to ½, is restored. Also, when all subbands of level 1 are decoded, an image having the same number of pixels as that of an original image is restored.

The image display pattern upon restoring and displaying an image in the aforementioned sequence will be explained using FIGS. 28A and 28B.

Figure 28A:
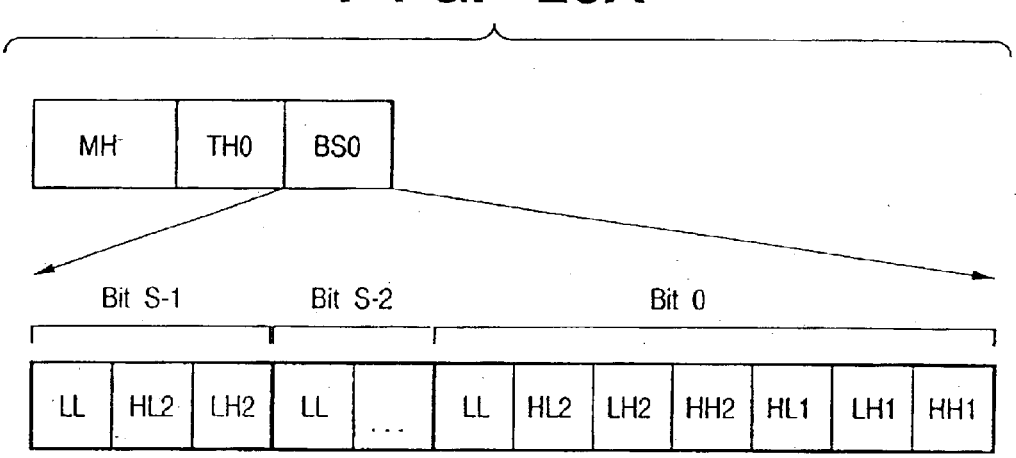
FIGS. 28A and 28B show the display pattern of an image upon reclaiming and displaying an image.
Figure 28B:
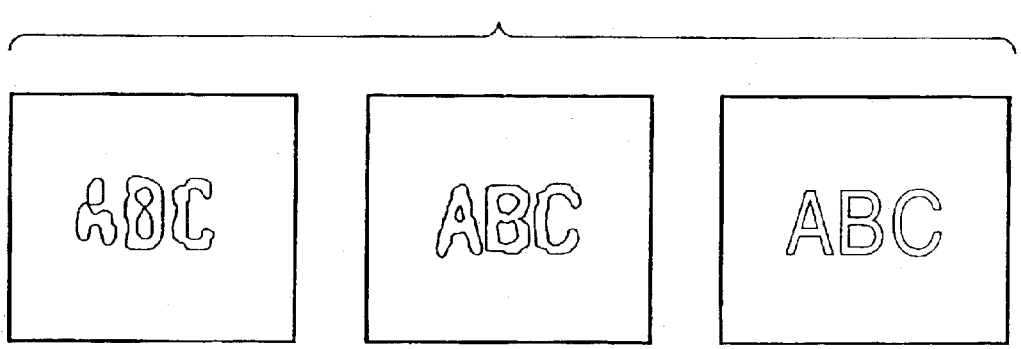
Figure 29:
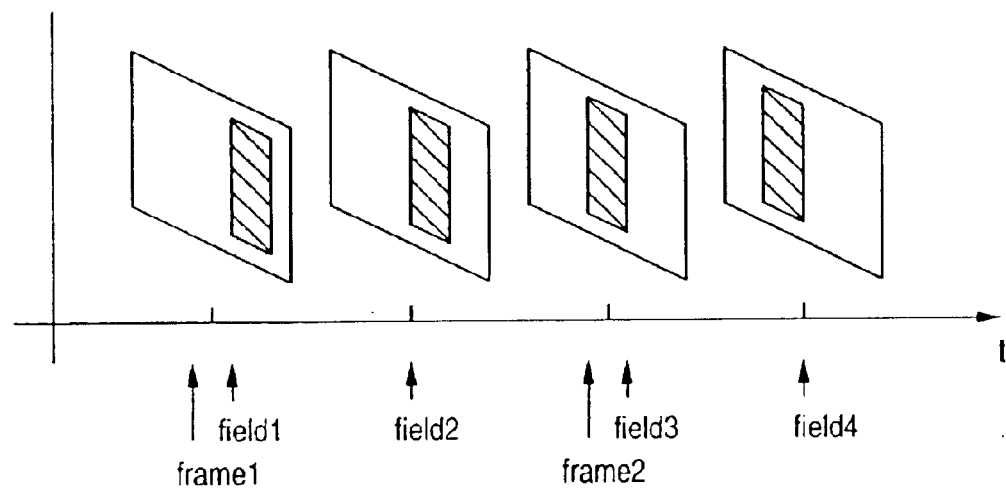
FIG. 29 is a chart for explaining the frame and field timings.
Figure 30A:
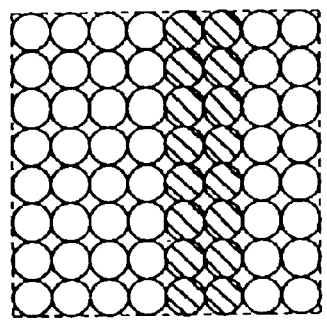
FIGS. 30A to 30C are views for explaining problems of a field image.
Figure 30B:
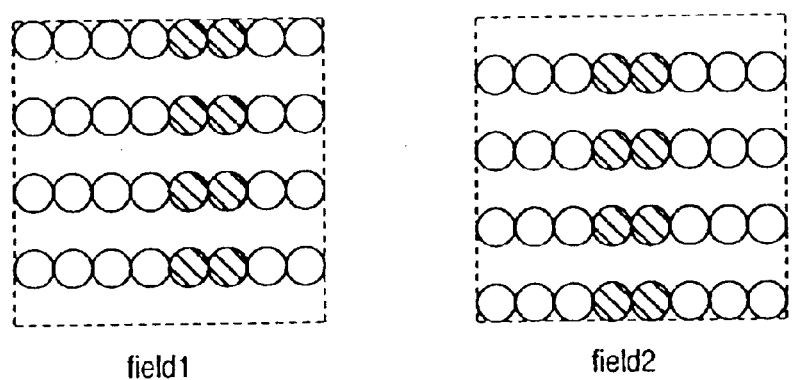
Figure 30C:
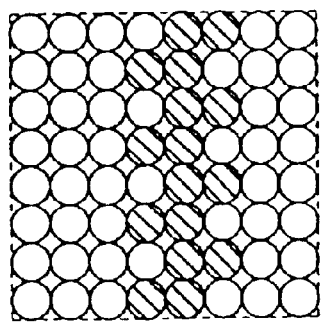

FIGS. 28A and 28B show the image display pattern upon restoring and displaying an image.

FIG. 28A shows an example of a code sequence, the basic format of which is based on FIGS. 22A to 22D. When the entire image is set as a tile, the code sequence includes only one tile header and bitstream. In this bitstream BS0, codes are set from the most significant bit plane to the least significant bit plane.

The image decoding apparatus sequentially reads this bitstream, and displays an image upon completion of decoding of codes of each bit plane. FIG. 28B shows an example of a change in quality of an image to be displayed upon decoding in turn from the most significant bit plane. In this example, when only the most significant bit plane is decoded, only an overall feature of an image is displayed. But as lower bit planes are decoded, the image quality is improved stepwise. When the quantization step $\Delta$ is "1" in quantization, an image displayed upon completion of decoding of all bit planes becomes exactly the same as an original image.

In the aforementioned example, when the entropy decoder 1202 limits (ignores) lower bit planes to be decoded, the size of encoded data to be received or processed is reduced, and the compression ratio can be consequently controlled. In this manner, a decoded image with required image quality can be obtained from only encoded data of the required data size. When the quantization step $\Delta$ upon encoding is "1", and all bit planes are decoded upon decoding, the restored image matches an original image, i.e., reversible encoding and decoding can be attained.

Preferred embodiments of the present invention will be described in detail below with reference to the accompanying drawings.

<First Embodiment>

Figure 1:
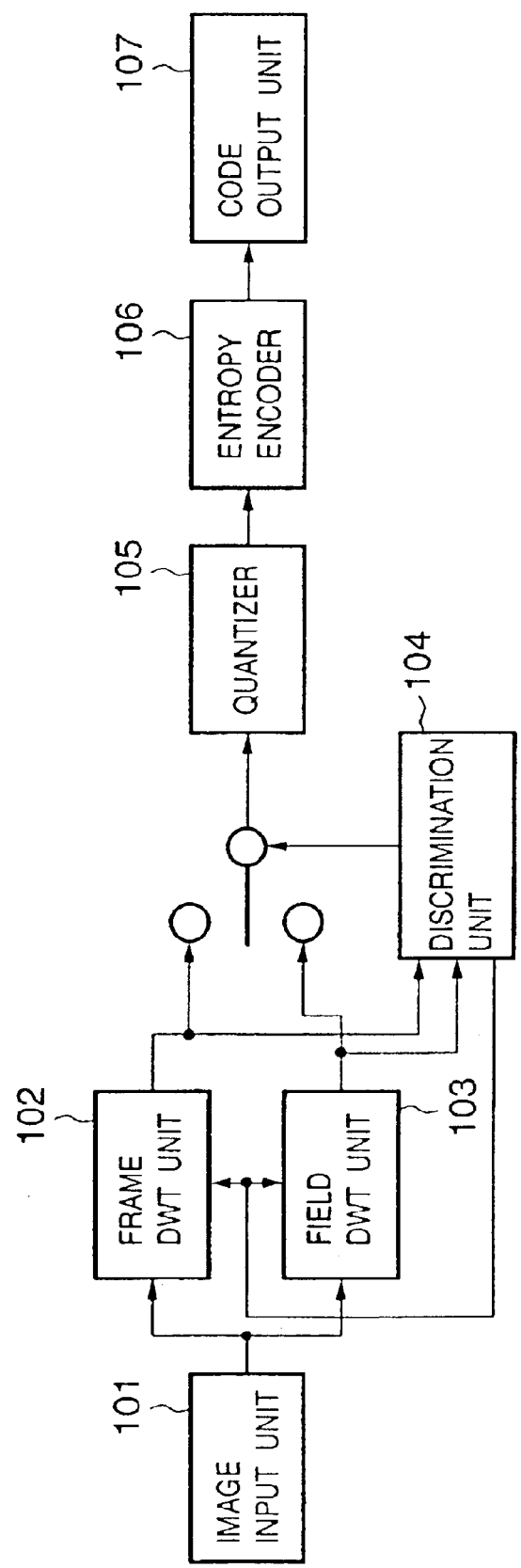
FIG. 1 is a schematic block diagram showing the arrangement of an image encoding apparatus of the first embodiment.

FIG. 1 is a schematic block diagram showing the arrangement of an image encoding apparatus of the first embodiment.

Reference numeral 101 denotes an image input unit; and 102, a frame discrete wavelet transformation (DWT) unit that executes a discrete wavelet transformation process in units of frames. Reference numeral 103 denotes a field discrete wavelet transformation (DWT) unit that executes a discrete wavelet transformation process in units of fields. Reference numeral 104 denotes a discrimination unit; 105, a quantizer; 106, an entropy encoder; and 107, a code output unit.

The image input unit 101 receives pixel signals that form an image to be encoded in the interlace format. The output signal from the image input unit 101 is input to the field DWT unit 103 at the field period. The frame DWT unit 102 receives reconstructed pixel signals having two fields as one frame.

The transformation process (frame DWT process) of the frame DWT unit 102 is the same as that of the DWT unit 702 explained in the image encoding apparatus shown in FIG. 16. The field DWT 103 executes discrete wavelet transformation processes (field DWT processes) in units of fields (i.e., twice). The field DWT process has substantially the same internal process as the frame DWT process except for a pixel sequence. Subbands obtained as outputs from each DWT unit are input to the discrimination unit 104, and are used in a discrimination process. Details of the discrimination process will be described later.

Subbands obtained by the frame or field DWT process are selected on the basis of the discrimination process result.

Note that the discrimination process is done in units of tiles. The frame or field DWT process selected for each tile can be identified by appending 1-bit identification information in each tile header. If an image is not broken up into tiles, the tile size is equal to the image size.

The quantizer 105 quantizes the input subbands by a predetermined quantization step, and outputs quantization indices corresponding to the quantized values. The entropy encoder 106 decomposes the input quantization indices into bit planes, executes binary arithmetic coding in units of bit planes, and outputs a code stream to the code output unit 107. The processes from the quantizer 105 to the code output unit 107 are the same as those from the quantizer 703 to the code output unit 705 in FIG. 16 in the prior art. When the processing contents are to be changed between processes in units of frames and those in units of fields, identification information in the tile header can be used. This identification information need not always be stored in the tile header, but a data table may be prepared by specifying a file format.

The processes executed by the image encoding apparatus of the first embodiment will be described below using FIG. 2.

FIG. 2 is a flow chart showing the processes executed by the image encoding apparatus of the first embodiment.

Note that the processing sequence from the frame DWT unit 102 to the discrimination unit 104 in FIG. 1 will be especially described in detail below.

Figure 3A:
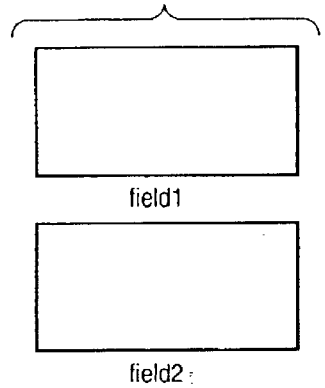
FIGS. 3A to 3I are views showing the configuration of an image during the processes.
Figure 3D:
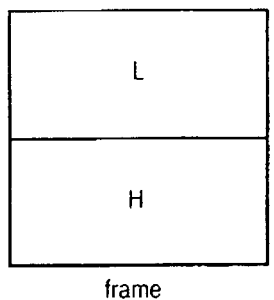
Figure 3G:
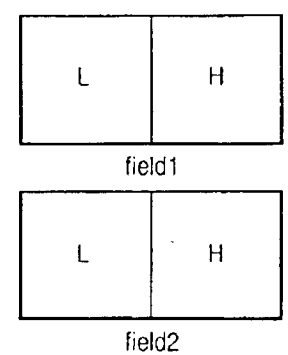
Figure 3B:
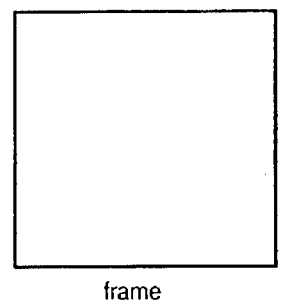

In step S201, field images are constructed. FIG. 3A shows an image model obtained at that time. In step S202, a frame image is constructed. FIG. 3B shows an image model obtained at that time.

Figure 3E:
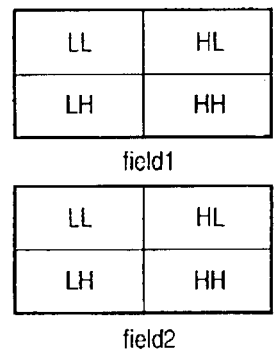
Figure 3H:
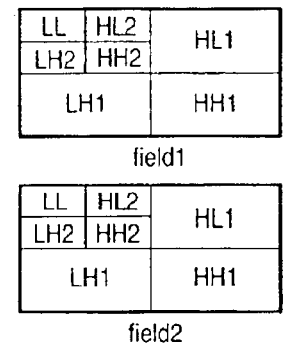
Figure 3C:
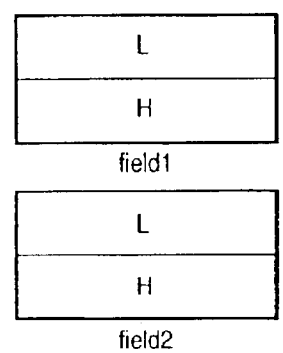

These field and frame images undergo vertical subband segmentation as a vertical DWT process in step S203. With this process, each image is segmented into two frequency bands in the vertical direction. FIG. 3C shows an image model corresponding to that shown in FIG. 3A, and FIG. 3D shows an image model corresponding to that shown in FIG. 3B. In step S204, high-frequency subbands of the respective image undergo an arithmetic process (coefficient process). The high-frequency subbands correspond to H regions in the images shown in FIGS. 3C and 3D. The high-frequency coefficient process computes the entropy or signal power values of subbands obtained by the frame and field DWT processes. Alternatively, variances of subbands may be computed.

In step S205, the computed arithmetic values are compared. If the arithmetic values of field subbands are smaller than those of frame subbands, the field DWT process is selected; if the arithmetic values of field subbands are larger than those of frame subbands, the frame DWT process is selected.

Figure 3F:
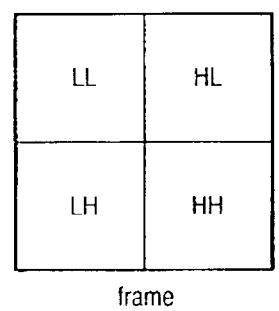

If the field DWT process is selected in step S205, the frame DWT process results are discarded, and horizontal subband segmentation as a horizontal DWT process is executed in step S206. FIG. 3E shows an image model after that process. On the other hand, if the frame DWT process is selected in step S205, the field DWT process results are discarded, and horizontal subband segmentation is done in step S206. FIG. 3F shows an image model after that process.

After horizontal subband segmentation in step S206, if the low-frequency range is to be recursively segmented into subbands, subband segmentation repeats itself up to a required level in step S207. FIG. 3H shows an image model obtained when the lower-frequency ranges of the field DWT process results are segmented into subbands again. On the other hand, an image model obtained when the lower-frequency range of the frame DWT process result has undergone subband segmentation again is the same as that shown in FIG. 19 in the prior art.

As a modification of the processes described with reference to FIG. 2, the processes shown in FIG. 4 may be executed.

Figure 4:
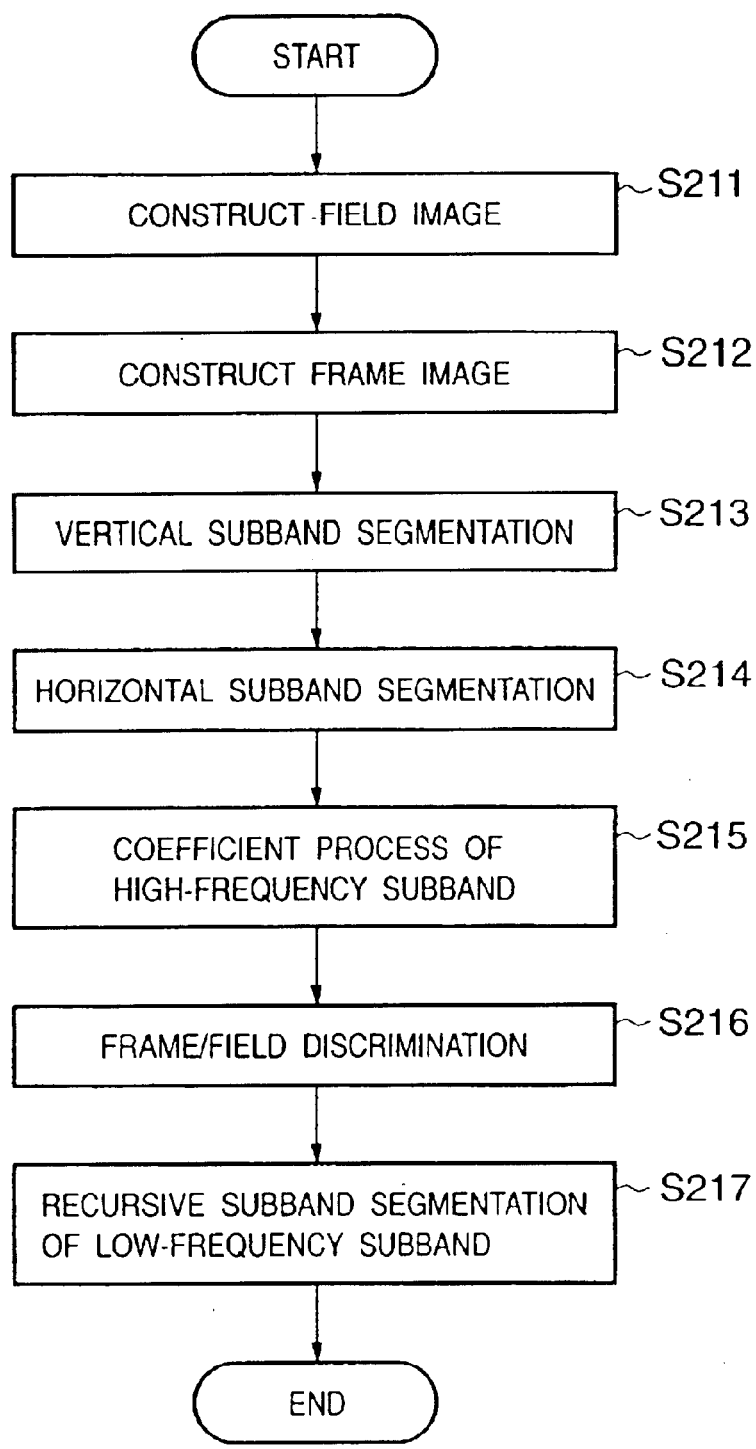
FIG. 4 is a flow chart showing a modification of the processes executed by the image encoding apparatus of the first embodiment.

FIG. 4 is a flow chart showing a modification of the processes executed by the image encoding apparatus of the first embodiment.

Since steps S211 to S213 are the same as steps S201 to S203 in FIG. 2, a description thereof will be omitted.

In step S214, field and frame images respectively undergo horizontal subband segmentation. FIG. 3E shows an image model obtained as a result of horizontal subband segmentation in units of fields, and FIG. 3F shows that obtained as a result of horizontal subband segmentation in units of frames. The order of vertical subband segmentation in step S213 and horizontal subband segmentation in step S214 may be reversed.

In step S215, a coefficient process of high-frequency subbands are executed. High-frequency subbands of the field and frame images are LH and HH of the image model in FIG. 3E, and LH and HH of the image model in FIG. 3F. The difference from the processes in FIG. 2 is that both horizontal and vertical components have undergone frequency transformation. Then, entropy or signal power values of subbands obtained by the frame and field DWT processes are then computed. Alternatively, variances of subbands may be computed.

In step S216, the computed arithmetic values are compared. If the arithmetic values of field subbands are smaller than those of frame subbands, the field DWT process is selected; if the arithmetic values of field subbands are larger than those of frame subbands, the frame DWT process is selected.

If the field DWT process is selected in step S216, the frame DWT process results are discarded; if the frame DWT process is selected, the field DWT process results are discarded. If a recursive subband segmentation process is not executed, the process ends. If a recursive subband segmentation process is executed, subband segmentation repeats itself up to a required level in step S217. FIG. 3H shows an image model obtained when the lower-frequency ranges of the field DWT process results are segmented into subbands again, as in FIG. 2. On the other hand, an image model obtained when the lower-frequency range of the frame DWT process result has undergone subband segmentation again is the same as that shown in FIG. 19 in the prior art.

The arrangement of an image decoding apparatus for decoding a bitstream obtained by the aforementioned image encoding apparatus will be described below using FIG. 5.

Figure 5:
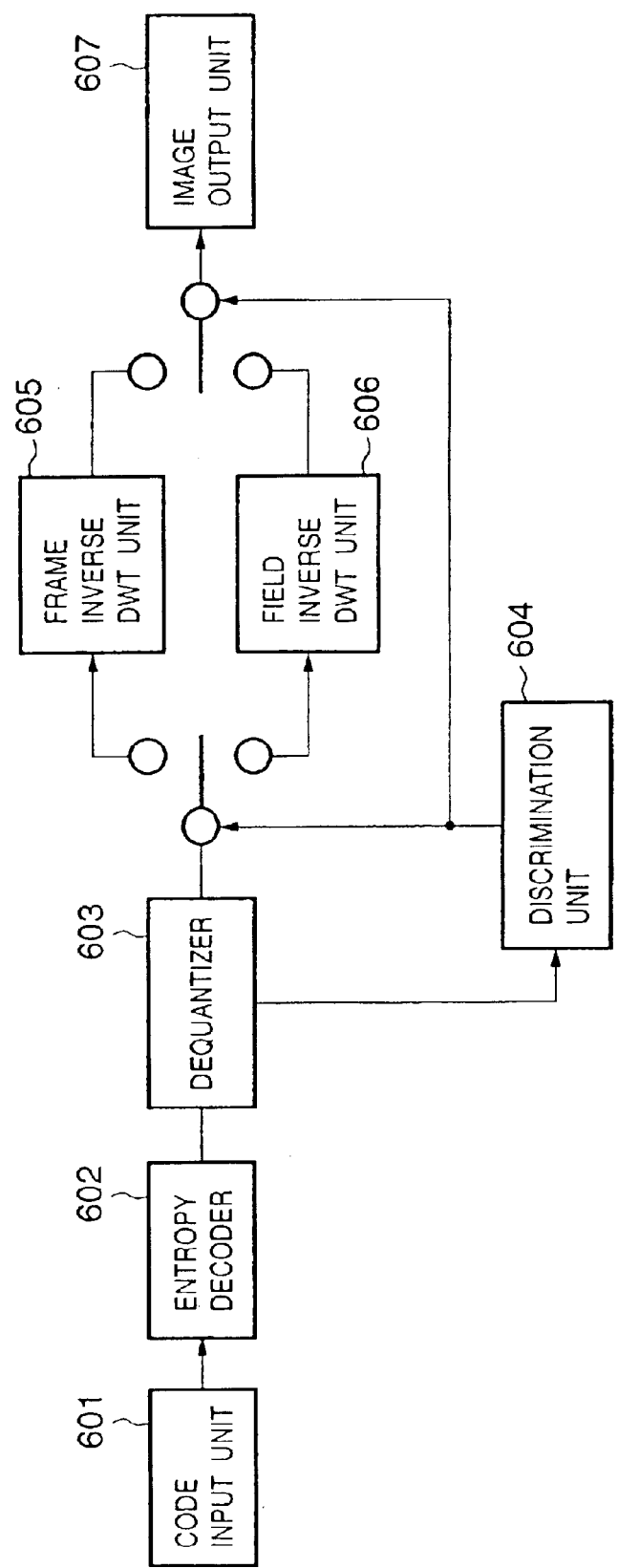
FIG. 5 is a block diagram showing the arrangement of an image decoding apparatus of the first embodiment.

FIG. 5 is a block diagram showing the arrangement of the image decoding apparatus of the first embodiment.

Reference numeral 601 denotes a code input unit; 602, an entropy decoder; 603, a dequantizer; 604, a discrimination unit; 605, a frame inverse discrete wavelet transformation (DWT) unit for computing inverse discrete wavelet transforms in units of frames; 606, a field inverse discrete wavelet transformation (DWT) unit for computing inverse discrete wavelet transforms in units of fields; and 607, an image output unit.

The processes from the code input unit 601 to the dequantizer 603 are the same as those from the code input unit 1201 to the dequantizer 1203 in FIG. 17 described in the prior art. Since frame/field identification information of each tile is embedded in the bitstream, the processing contents can be changed between processes in units of frames and those in units of fields.

Upon completion of the process in the dequantizer 603, the discrimination unit 604 reads frame/field identification information of each tile, and if the process in units of frames is selected, the unit 604 selects the frame inverse DWT unit 605; if the process in units of fields is selected, it selects the field inverse DWT unit 606.

The image output unit 607 receives an image output from the DWT unit selected by the discrimination unit 604, and constructs an interlaced image.

The processes executed by the image decoding apparatus of the first embodiment will be explained below using FIG. 6.

Figure 6:
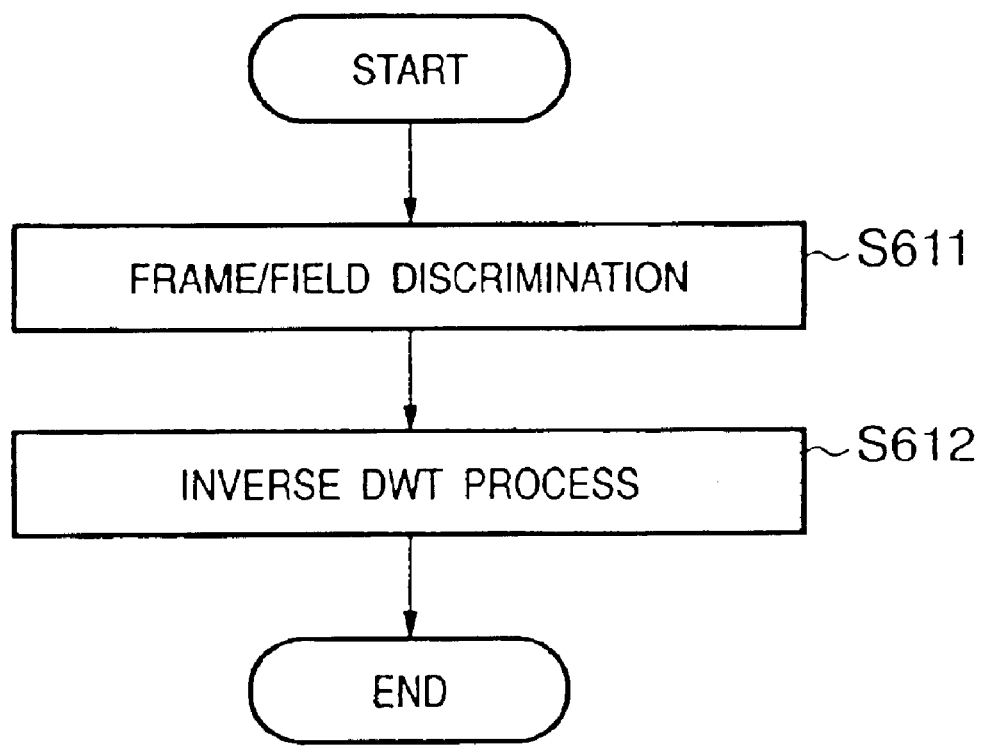
FIG. 6 is a flow chart showing processes executed by the image decoding apparatus of the first embodiment.

FIG. 6 is a flow chart showing processes executed by the image decoding apparatus of the first embodiment.

Note that the processing sequence from the discrimination unit 604 to the field inverse DWT unit 606 in FIG. 5 will be particularly explained in detail below.

In step S611, frame/field identification information of each tile is read. If a process in units of frames is selected, the frame inverse DWT unit 605 is selected; if a process in units of fields is selected, the field inverse DWT unit 606 is selected.

If the process in units of frames is selected, the input subbands undergo a frame inverse DWT process (frame subband synthesis process) in step S612. On the other hand, if the process in units of fields is selected, the input subbands undergo a field inverse DWT process (field subband composition process).

As described above, according to the first embodiment, after an interlaced moving image undergoes frame and field DWT processes to one level, subbands of high-frequency ranges of the obtained images undergo an arithmetic process. Since the subsequent DWT process in units of frames or fields is appropriately selected based on this arithmetic result, a DWT process can be done while maintaining high-quality image information. For this reason, a high-quality reconstructed image can be generated upon decoding an encoded image obtained by this DWT process.

<Second Embodiment>

Figure 7:
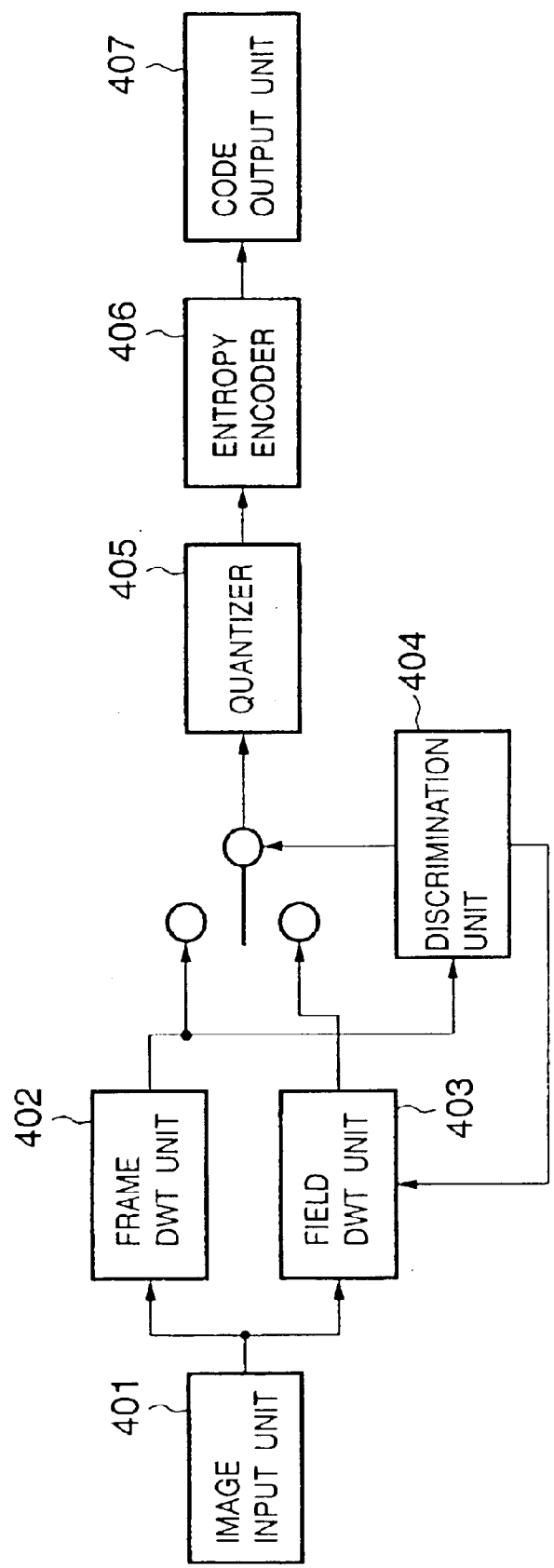
FIG. 7 is a schematic block diagram showing the arrangement of an image encoding apparatus of the second embodiment.

FIG. 7 is a schematic block diagram showing the arrangement of an image encoding apparatus of the second embodiment.

Reference numeral 401 denotes an image input unit; and 402, a frame discrete wavelet transformation (DWT) unit that executes a discrete wavelet transformation process in units of frames. Reference numeral 403 denotes a field discrete wavelet transformation (DWT) unit that executes a discrete wavelet transformation process in units of fields. Reference numeral 404 denotes a discrimination unit; 405, a quantizer; 406, an entropy encoder; and 407, a code output unit. Although the arrangement of blocks is the same as that in FIG. 1, a discrimination process in the discrimination unit 404 is done based on only the output from the frame DWT unit 402 unlike in the first embodiment.

Processes executed by the image encoding apparatus of the second embodiment will be described below using FIG. 8.

Figure 8:
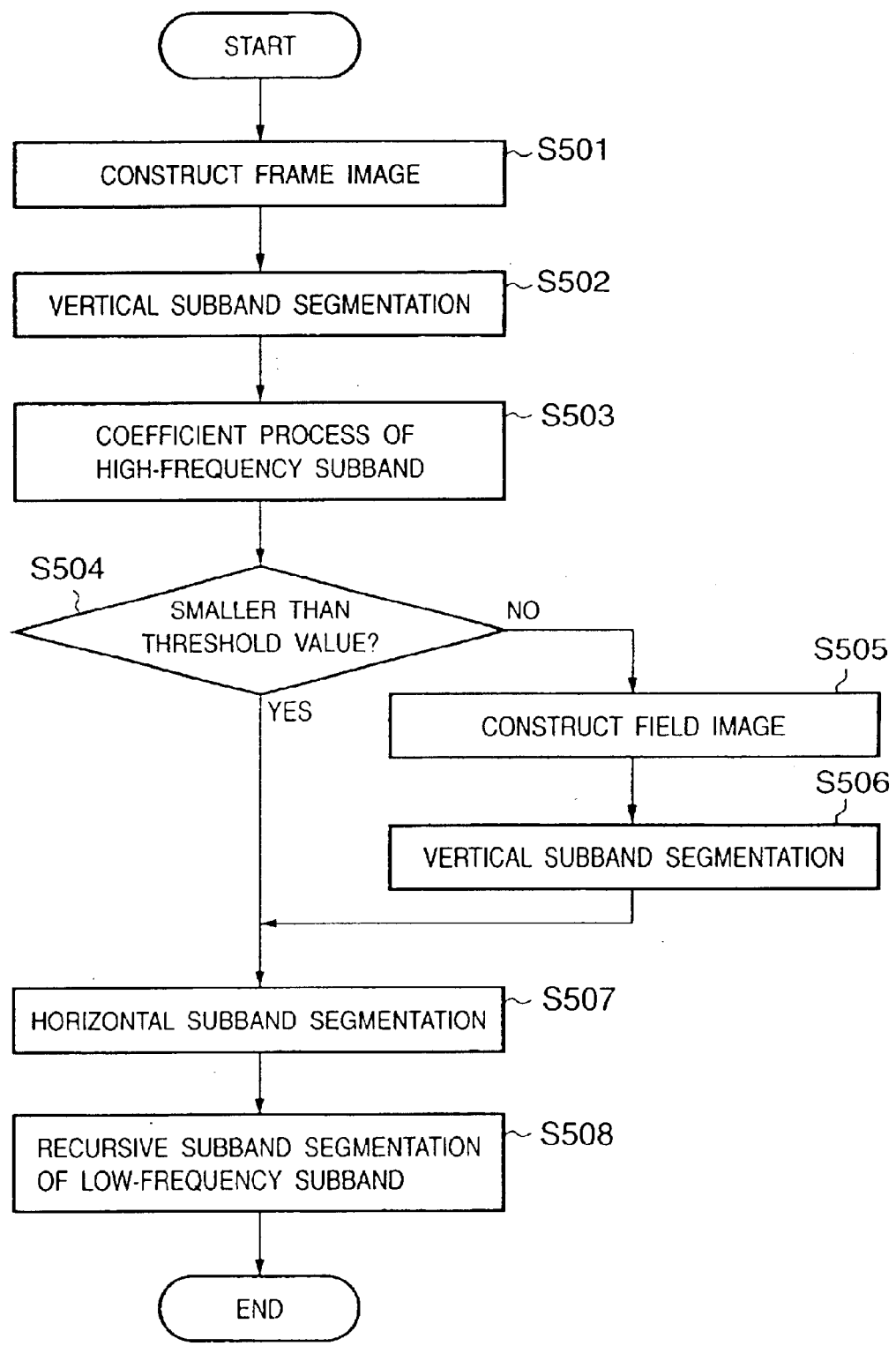
FIG. 8 is a flow chart showing processes executed by the image encoding apparatus of the second embodiment.

FIG. 8 is a flow chart showing the processes executed by the image encoding apparatus of the second embodiment.

Note that the processing sequence from the frame DWT unit 402 to the discrimination unit 404 in FIG. 4 will be described in detail.

In step S501, a frame image is constructed. FIG. 3B shows an image model obtained at that time. The frame image undergoes vertical subband segmentation as a vertical DWT process in step S502. With this process, each image is segmented into two frequency bands in the vertical direction. FIG. 3D shows an image model corresponding to that shown in FIG. 3B. In step S503, high-frequency subbands of the respective image undergo an arithmetic process (coefficient process). The high-frequency subbands correspond to H regions in the images shown in FIG. 3D. Using high-frequency subbands, one of an entropy, signal power, variance, and the like is computed.

In step S504, the computed arithmetic value is compared with a predetermined threshold value. If the arithmetic value is smaller than the threshold value (YES in step S504), a process in units of frames is determined, and the flow advances to step 3507; if the arithmetic value is larger than the threshold value (NO in step S504), a process in units of fields is determined, and the flow advances to step S505.

If the process in units of fields is determined in step S504, the frame DWT process result is discarded, and field images are constructed in step S505. FIG. 3A shows an image model at that time. In step S506, vertical subband segmentation is done in units of fields. FIG. 3C shows an image model at that time.

On the other hand, if the process in units of frames is determined in step S504, horizontal subband segmentation is done in step S507. FIG. 3F shows an image model after that process. Even when the process in units of fields is selected, this horizontal subband process is commonly done. FIG. 3E shows an image model at that time. If the low-frequency range is to be further segmented into subbands, subband segmentation repeats itself up to a required level in step S508. This process is the same as that in step S207 in FIG. 2. FIG. 3H shows the result obtained when the image model shown in FIG. 3E has undergone the process in step S508 once. On the other hand, the result obtained when the image model shown in FIG. 3F has undergone the process in step S508 once is the same as that shown in FIG. 19 in the prior art.

Figure 3I:
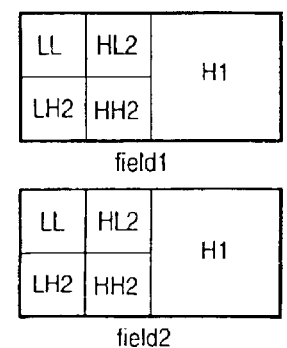

If the same number of subbands are to be processed in the frame and field processes in place of the number of times of subband segmentation, step S506 may be omitted. FIG. 3G shows an image model after horizontal subband segmentation in step S507. FIG. 3I shows the result obtained when the result shown in FIG. 3G has undergone the process in step S508 once.

As a modification of the processes described with reference to FIG. 8, the processes shown in FIG. 9 may be executed.

Figure 9:
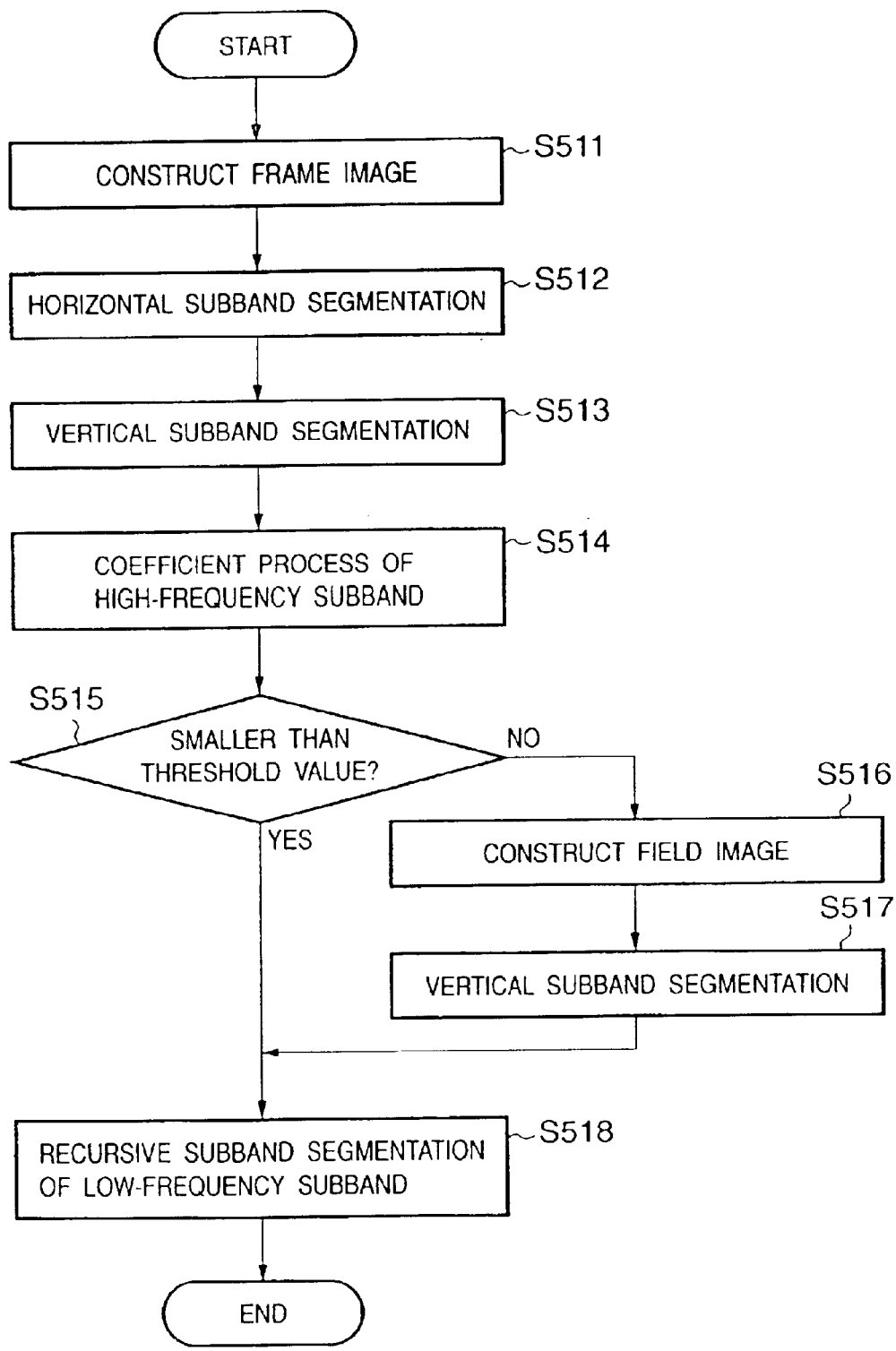
FIG. 9 is a flow chart showing a modification of processes executed by the image encoding apparatus of the second embodiment.

FIG. 9 is a flow chart showing a modification of the processes executed by the image encoding apparatus of the second embodiment.

Step S511 is the same as step S501 in FIG. 8. In step S512, a frame image undergoes horizontal subband segmentation as a horizontal DWT process. In step S513, vertical subband segmentation as a vertical DWT process is executed. FIG. 3F shows an image model obtained after that process.

In step S514, a coefficient process of high-frequency subbands is executed. High-frequency subbands are LH and HH in FIG. 3F. The difference from the processes in FIG. 8 is that both horizontal and vertical components have undergone frequency transformation. Then, one of an entropy, signal power, variance, and the like is computed using high-frequency subbands.

In step S515, the computed arithmetic value is compared with a predetermined threshold value. If the arithmetic value is smaller than the threshold value (YES in step S515), a process in units of frames is determined, and the flow advances to step S518; if the arithmetic value is larger than the threshold value (NO in step S515), a process in units of fields is determined, and the flow advances to step S516.

If the process in units of fields is determined in step S515, the frame DWT process result is discarded, and field images are constructed in step S516. At this time, the horizontal subband segmentation result in units of frames generated in step S512 can be used. Upon completion of the process in step S512, since the image has not undergone frequency transformation in the vertical direction yet, the image model shown in FIG. 3G is obtained by separating in units of lines. If this image model shown in FIG. 3G undergoes vertical subband segmentation in step S517, an image model shown in FIG. 3E is obtained.

On the other hand, if the process in units of frames is determined in step S515, the processing proceeds. If the low-frequency range is to be segmented, subband segmentation repeats itself up to a required level in step S518. Upon segmenting the low-frequency range into subbands again, the same image model as in FIG. 8 is obtained. That is, FIG. 3H shows the result obtained when the image model shown in FIG. 3E has undergone the process in step S518 once. On the other hand, the result obtained when the image model shown in FIG. 3F has undergone the process in step S518 once is the same as that shown in FIG. 19 in the prior art.

If the same number of subbands are to be processed in the frame and field processes in place of the number of times of subband segmentation, step S517 may be omitted. Since FIG. 3G shows the image constructed in step S516, FIG. 3I shows the result obtained when the result shown in FIG. 3G has undergone the process in step S518 once.

The image encoding apparatus described in the second embodiment outputs the same bitstream as that output from the image encoding apparatus described in the first embodiment. Therefore, since that bitstream can be decoded by the image decoding apparatus described in the first embodiment, a description of the image decoding apparatus will be omitted.

As described above, according to the second embodiment, after an interlaced moving image undergoes a DWT process to one level in units of frames, the obtained high-frequency subbands undergo an arithmetic process. Since the subsequent DWT process in units of frames or fields is appropriately selected based on this arithmetic result, a DWT process can be done while maintaining high-quality image information. For this reason, a high-quality reconstructed image can be generated upon decoding an encoded image obtained by this DWT process.

Compared to the first embodiment, since both frame and field DWT processes to one level need not be executed, the processing load can be reduced.

<Third Embodiment>

Figure 10:
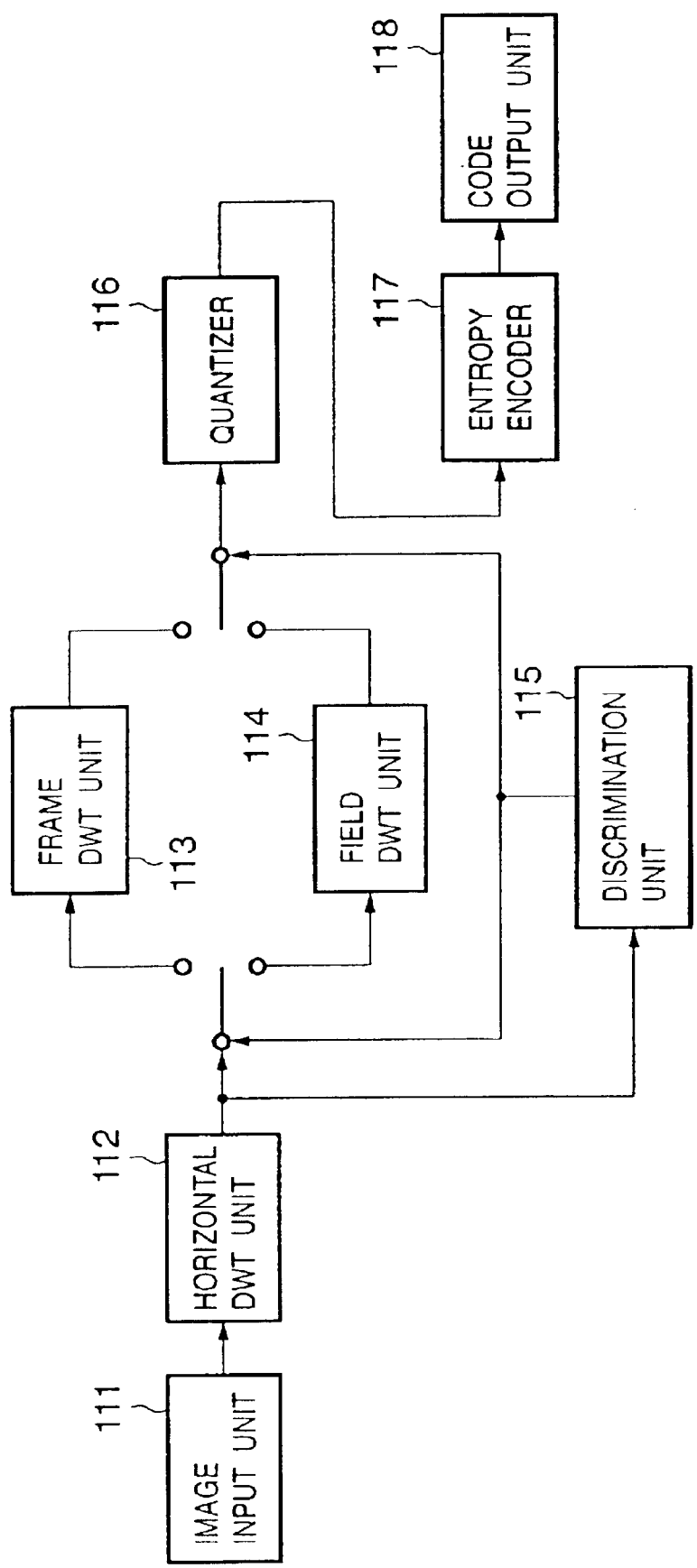
FIG. 10 is a schematic block diagram showing the arrangement of an image encoding apparatus of the third embodiment.

FIG. 10 is a schematic block diagram showing the arrangement of an image encoding apparatus of the third embodiment.

Reference numeral 111 denotes an image input unit; and 112, a horizontal discrete wavelet transformation (horizontal DWT) unit; and 113, a frame discrete wavelet transformation (DWT) unit that executes a discrete wavelet transformation process in units of frames. Reference numeral 114 denotes a field discrete wavelet transformation (DWT) unit that executes a discrete wavelet transformation process in units of fields. Reference numeral 115 denotes a discrimination unit; 116, a quantizer; 117, an entropy encoder; and 118, a code output unit.

The image input unit 101 receives pixel signals that form an image signal to be encoded in the interlace format. The output pixel signals are arranged in the frame format, and undergo horizontal discrete wavelet transformation in the horizontal DWT unit 112. The transformed data is sent to the discrimination unit 115.

The discrimination unit 115 selects based on the input signal if the process in units of frames or fields is to be done. The discrimination method will be described later. Note that the discrimination process is done in units of files. The frame or field process selected for each tile can be identified by appending 1-bit identification information in each tile header. This identification information need not always be stored in the tile header, but a data table may be prepared by specifying a file format. If an image is not broken up into tiles, the tile size is equal to the image size.

The quantizer 116 quantizes the input subbands by a predetermined quantization step, and outputs quantization indices corresponding to the quantized values. The entropy encoder 117 decomposes the input quantization indices into bit planes, executes binary arithmetic coding in units of bit planes, and outputs a code stream to the code output unit 118. The processes from the quantizer 116 to the code output unit 118 are the same as those from the quantizer 703 to the code output unit 705 in FIG. 16 in the prior art. When the processing contents are to be changed between processes in units of frames and those in units of fields, identification information in the tile header can be used.

The processes executed by the image encoding apparatus of this embodiment will be described below using FIG. 11.

Figure 11:
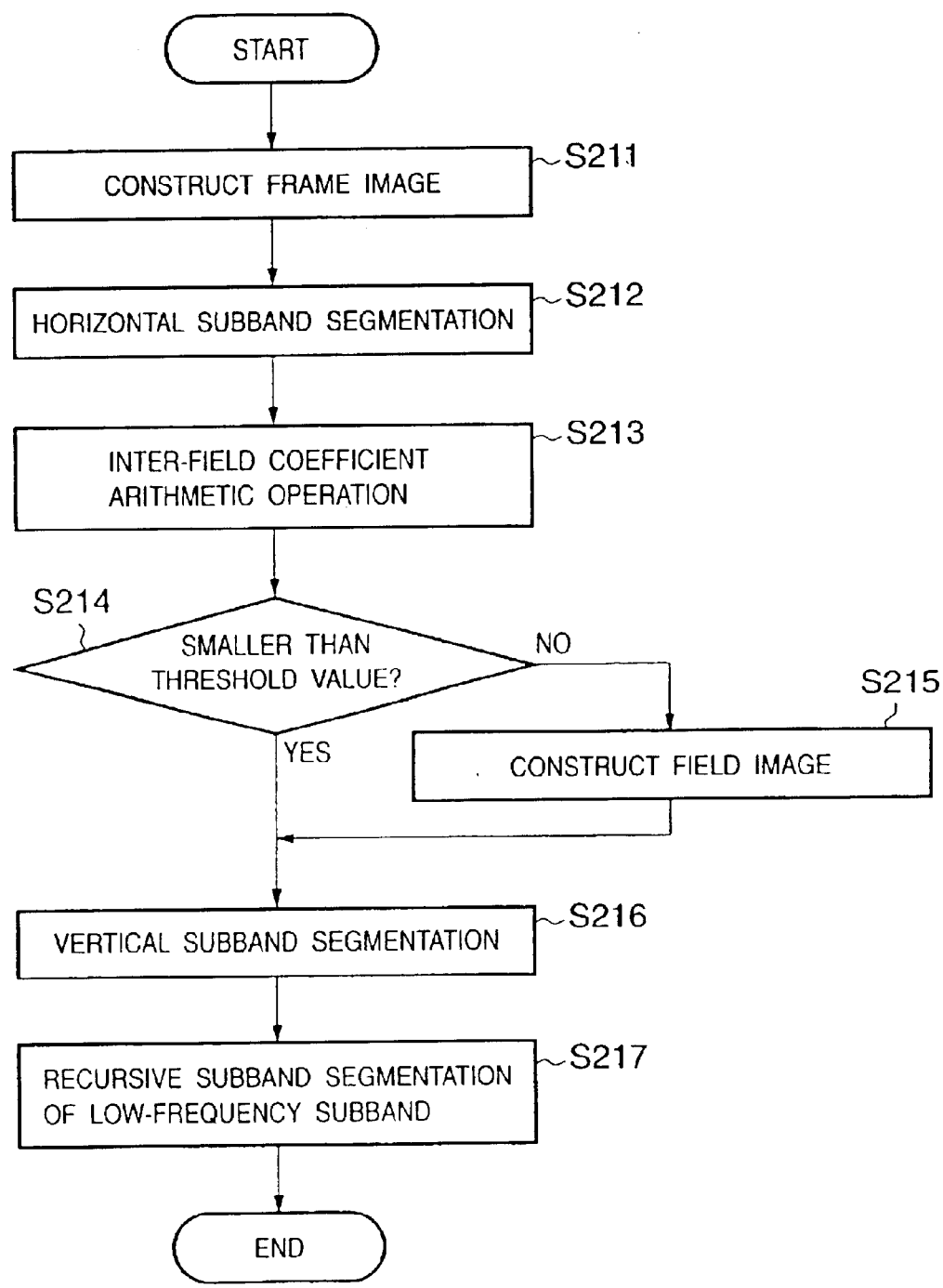
FIG. 11 is a flow chart showing processes executed by the image encoding apparatus of the third embodiment.

FIG. 11 is a flow chart showing the processes executed by the image encoding apparatus of the third embodiment.

Note that the processing sequence from the image input unit 111 to the field DWT unit 114 in FIG. 10 will be especially described in detail below.

Figure 12A:
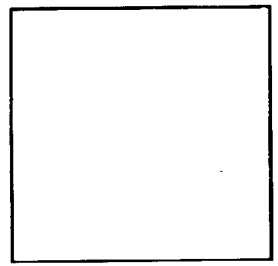
FIGS. 12A to 12H are views showing the configuration of an image during the processes of the third embodiment.
Figure 12D:
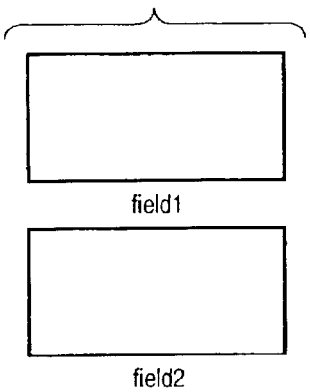
Figure 12G:
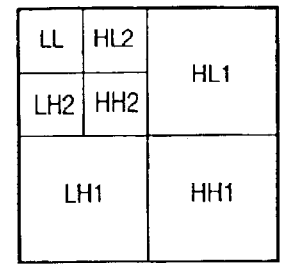
Figure 12B:
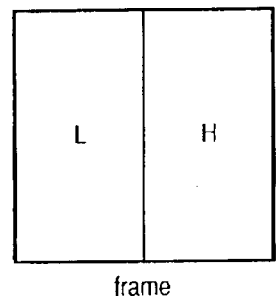

In step S211, a frame image is constructed. FIG. 12A shows an image model obtained at that time. In step S212, horizontal subband segmentation as a horizontal DWT process is executed. FIG. 12B shows an image model at that time. Note that L indicates the low-frequency subband, and H, a high-frequency subband.

In step S213, a coefficient arithmetic operation between fields is made. Some arithmetic operation methods are available, and details will be described later. In step S214, the computed arithmetic value is compared with a predetermined threshold value. If the arithmetic value is smaller than the threshold value (YES in step S214), a process in units of frames is determined, and the flow advances to step S216; if the arithmetic value is larger than the threshold value (NO in step S214), a process in units of fields is determined, and the flow advances to step S215.

Figure 12E:
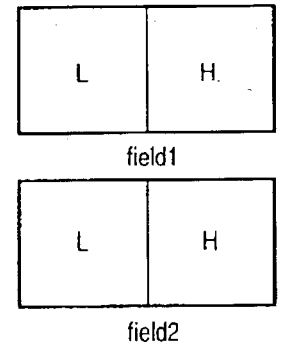

If the process in units of frames is determined in step S214, since an image model remains the same, the process in step S216 is directly executed. If the process in units of fields is to be done, image data in units of fields must be reconstructed based on that in units of frames. In a normal process, an image model of FIG. 12D is generated based on FIG. 12A as that of an original image in step S215. However, in the third embodiment, since the original image has undergone horizontal subband segmentation in step S212, field images need not be generated from an image model shown in FIG. 12A, and an image model shown in FIG. 12B undergoes subband segmentation to generate an image model shown in FIG. 12E.

Figure 12H:
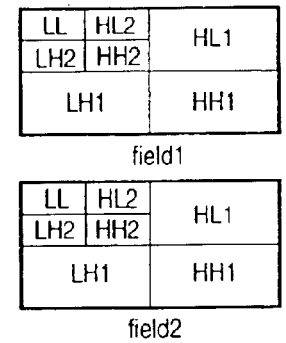
Figure 12C:
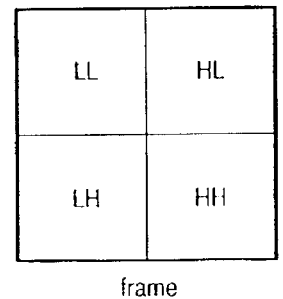
Figure 12F:
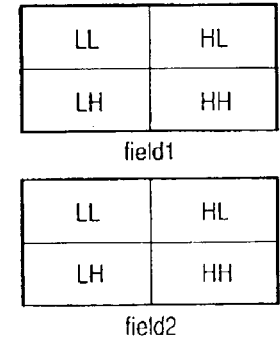

In step S216, vertical subband segmentation as a vertical DWT process is executed. If the process in units of frames is determined in the previous process, an image model shown in FIG. 12C is generated by this vertical subband segmentation. On the other hand, if the process in units of fields is determined, an image model shown in FIG. 12F is generated by this vertical subband segmentation.

When the low-frequency range is recursively segmented into subbands, horizontal/vertical subband segmentation processes repeat themselves up to a required level. When the image model in FIG. 12C generated in units of frames undergoes the horizontal/vertical subband segmentation processes once for each process, an image model shown in FIG. 12G is generated. On the other hand, when the image model in FIG. 12F generated by the process in units of fields undergoes the horizontal/vertical subband segmentation processes once for each process, an image model shown in FIG. 12H is generated.

The flow of the processes executed in FIG. 11 will be summarized using FIG. 12. In case of the process in units of frames, an image is transformed in the order of FIG. 12A→12B→12C→12G; in case of the process in units of fields, an image is transformed in the order of FIG. 12A→12B→12E→12F→12H.

Since the difference between the processes in units of frames and those in units of fields is the pixel arrangement, processes can be commonized by either hardware or software in consideration of the input/output data arrangements.

Details of the coefficient arithmetic operation will be explained below.

Basically, an inter-field arithmetic process is done. However, when the tile size is large, a heavy load is imposed on the arithmetic process upon processing all data. If no tile segmentation is done, since one tile corresponds to one frame, all pixels must be processed at one time. In the third embodiment, the load on the arithmetic process is reduced using a low-frequency subband obtained by horizontal subband segmentation.

Figure 13A:
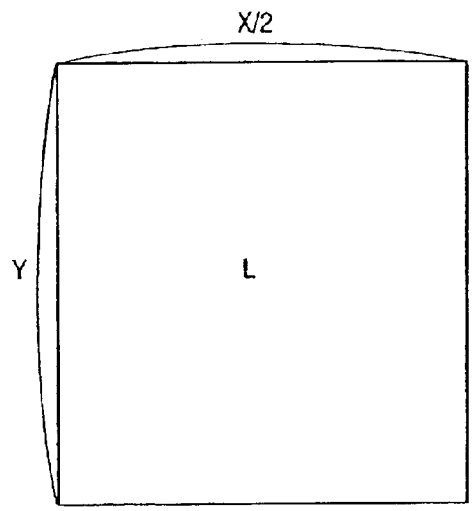
FIGS. 13A to 13D are views for explaining coefficient arithmetic operations in the third embodiment.
Figure 13C:
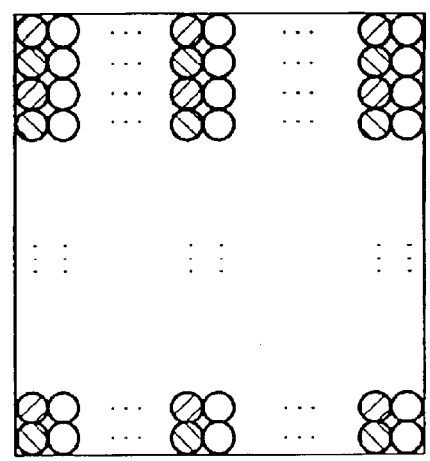
Figure 13B:
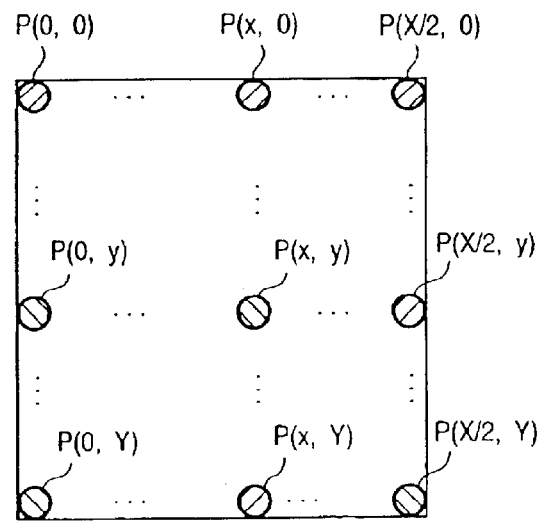

FIG. 13A shows a low-frequency image model in the image model of FIG. 12B. If one tile is formed by data of X pixels in the horizontal direction×Y pixels in the vertical direction, the data size in the horizontal direction in FIG. 13A is X/2 pixels since subband segmentation has already been done, while the data size in the vertical direction remains Y pixels. FIG. 13B is a view for explaining the arrangement of pixels that form this tile. As one method of the arithmetic process, the sum of the absolute values of differences between fields may be computed. If P(x, y) represents a pixel value at a position (x, y), an arithmetic value SUM is given by:

$$SUM = \sum_{x=0}^{X/2} abs\left(\sum_{y=0}^{Y} (-1)^y P(x, y)\right)$$

Figure 14A:
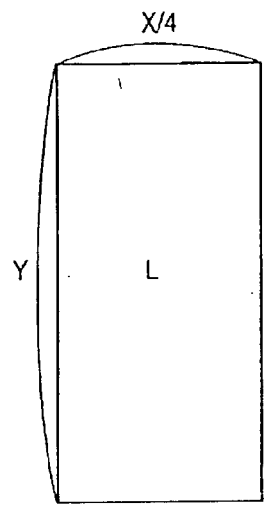
FIGS. 14A to 14F are views for explaining coefficient arithmetic operations in the third embodiment.
Figure 14B:
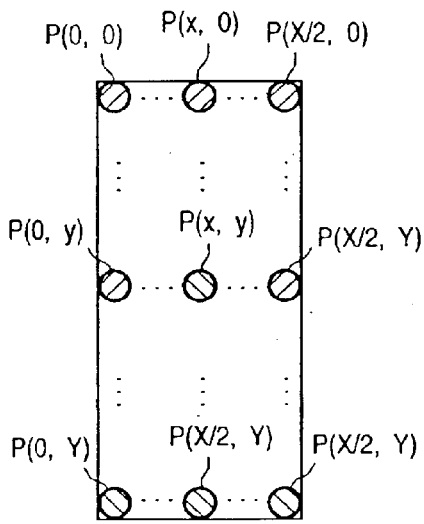

In this manner, using the low-frequency subband after subband segmentation, the data size to be computed can be reduced. As a simpler method, an arithmetic process may be done after low-frequency subbands are decimated in the horizontal direction. FIG. 13C shows an example in which pixels are decimated to ½ in the horizontal direction. The data size upon decimating pixels to ½ in the horizontal direction is X/4 pixels in the horizontal direction×Y pixels in the vertical direction. FIG. 14B shows an arrangement of pixels that form this tile. Hence, an arithmetic value SUM is given by:

$$SUM = \sum_{x=0}^{X/4} abs\left(\sum_{y=0}^{Y} (-1)^y P(x, y)\right)$$

Figure 13D:
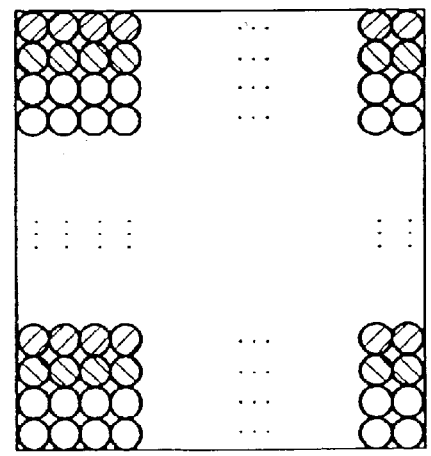
Figure 14C:
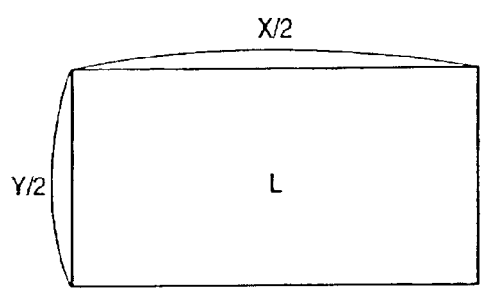
Figure 14D:
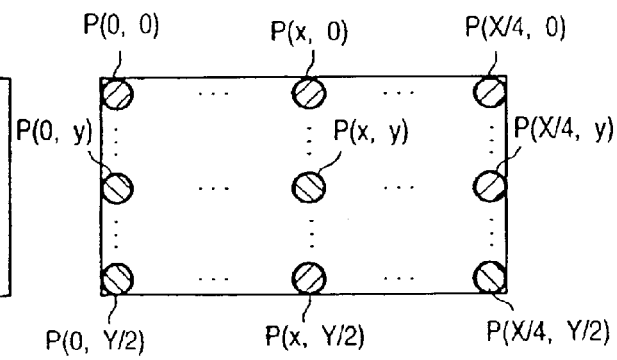

On the other hand, an arithmetic process may be done after low-frequency subbands are decimated in the vertical direction. Upon decimating subbands in the vertical direction, paired upper and lower pixels must be left undisturbed. FIG. 13D shows an example in which pixels are decimated to ½ in the vertical direction. The data size upon decimating pixels to ½ in the vertical direction is X/2 pixels in the horizontal direction×Y/2 pixels in the vertical direction, as shown in FIG. 14C. FIG. 14D shows an arrangement of pixels which form this tile. Hence, an arithmetic value SUM is given by:

$$SUM = \sum_{x=0}^{X/2} abs\left(\sum_{y=0}^{Y/2} (-1)^y P(x, y)\right)$$

Figure 14E:
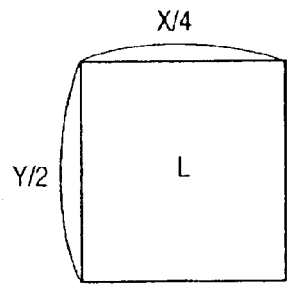
Figure 14F:
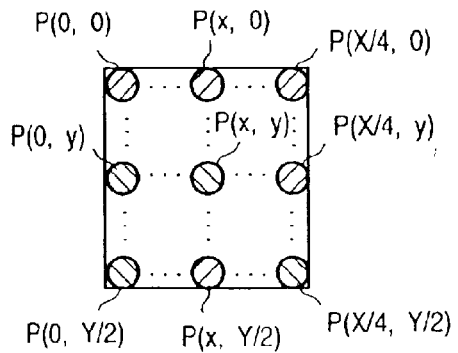

Of course, an arithmetic process may be done after data are decimated in both the horizontal and vertical directions. The data size upon decimating pixels to ½ in both the horizontal and vertical directions is X/4 pixels in the horizontal direction×Y/2 pixels in the vertical direction, as shown in FIG. 14E. FIG. 14F shows an arrangement of pixels which form this tile. Hence, an arithmetic value SUM is given by:

$$SUM = \sum_{x=0}^{X/4} abs\left(\sum_{y=0}^{Y/2} (-1)^y P(x, y)\right)$$

In order to reduce the load on the coefficient arithmetic operation in step S213 in FIG. 11, the coefficient arithmetic operation may be made as follows.

Figure 15A:
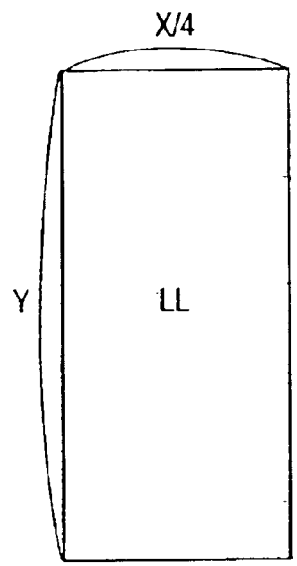
FIGS. 15A to 15D are views for explaining coefficient arithmetic operations in the third embodiment.
Figure 15C:
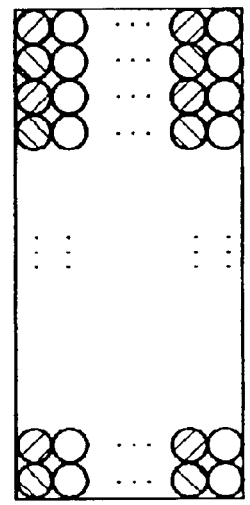
Figure 15B:
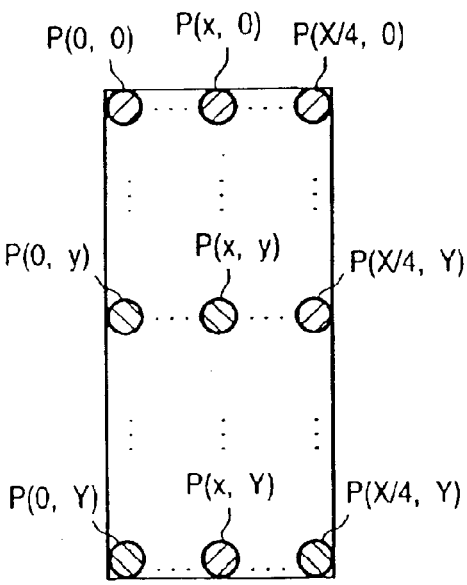

That is, a low-frequency image model in the image model shown in FIG. 13A undergoes horizontal subband segmentation again. As a result, an image model shown in FIG. 13A as the low-frequency image model (L data) in the image model of FIG. 12B is further broken up into low-frequency data (LL data) and high-frequency data (HL data). FIG. 15A shows the segmented low-frequency image model, and the data size of this image model is X/4 pixels in the horizontal direction×Y pixels in the vertical direction. FIG. 15B shows a sequence of pixels that form this tile. Hence, an arithmetic value SUM is given by:

$$SUM = \sum_{x=0}^{X/4} abs\left(\sum_{y=0}^{Y} (-1)^y P(x, y)\right)$$

Figure 15D:
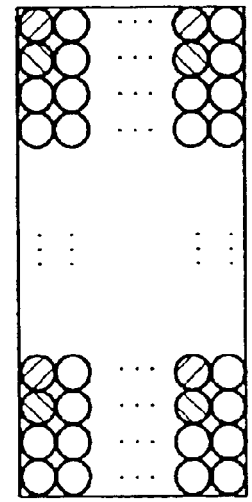

In this manner, by repeating horizontal subband segmentation for the low-frequency image model, the number of data to be processed in the arithmetic process can be reduced while maintaining given arithmetic precision. Of course, the arithmetic volume may be reduced by combining recursive subband segmentation and data decimation. That is, an arithmetic process may be made after pixels are decimated to ½ in the horizontal direction, as shown in FIG. 15C, or after pixels are decimated to ½ in the horizontal and vertical directions, as shown in FIG. 15D.

Note that an image decoding apparatus that decodes a bitstream obtained by the image encoding apparatus mentioned above comprises an arrangement opposite to that of the image encoding apparatus (i.e., a code input unit, entropy decoder, dequantizer, frame/field inverse DWT units, horizontal inverse DWT unit, and image output unit), and can reclaim an original image using the frame or field inverse DWT unit as needed on the basis of identification information in the bitstream.

As described above, according to the third embodiment, after an interlaced moving image undergoes horizontal subband segmentation to one level, the obtained subbands undergo an arithmetic process. Since the subsequent DWT process in units of frames or fields is appropriately selected and executed based on the arithmetic result, a DWT process can be done while maintaining high-quality image information. For this reason, a high-quality reconstructed image can be generated upon decoding an encoded image obtained by this DWT process.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the aforementioned flow charts.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for encoding input moving image data, comprising:

first segmentation means for making subband segmentation of the input moving image data into in units of frames using wavelet transformation;

second segmentation means for making subband segmentation of the input moving image data in units of fields using wavelet transformation;

arithmetic means for making an arithmetic process of first subbands obtained by said first segmentation means; and discrimination means for discriminating based on a first arithmetic value obtained by said arithmetic means whether to apply said first or second segmentation means to the input moving image data, wherein a discrimination of said discrimination means is not performed on the basis of subbands obtained by said second segmentation means.

2. The apparatus according to claim 1, wherein said arithmetic means also makes the arithmetic process for second subbands obtained by said second segmentation means to output a second arithmetic value.

3. The apparatus according to claim 2, wherein said discrimination means discriminates based on the first and second arithmetic values if said first or second segmentation means is applied to the input moving image data.

4. The apparatus according to claim 1, wherein said discrimination means discriminates based on a comparison result between the first arithmetic value and a predetermined value whether to apply said first or second segmentation means to the input moving image data.

5. The apparatus according to claim 1, wherein a discrimination result of said discrimination means is generated as identification information.

6. The apparatus according to claim 1, wherein said arithmetic means makes the arithmetic process of a high-frequency subband obtained after the input moving image data has undergone vertical subband segmentation.

7. The apparatus according to claim 1, wherein said arithmetic means makes the arithmetic process of a high-frequency subband obtained after the input moving image data has undergone vertical subband segmentation and horizontal subband segmentation.

8. The apparatus according to claim 1, wherein said arithmetic means makes the arithmetic process for computing one of an entropy, signal power, and variance of the subband.

9. The apparatus according to claim 1, wherein when said discrimination means determines that said second segmentation means is applied, vertical subband segmentation by said second segmentation means uses data obtained after said first segmentation means executes horizontal subband segmentation of the input moving image data.

10. An image processing method for encoding input moving image data, comprising:
    a first segmentation step, of making subband segmentation of the input moving image data in units of frames using wavelet transformation;
    a second segmentation step, of making subband segmentation of the input moving image data in units of fields using wavelet transformation;
    an arithmetic step, of making an arithmetic process of first subbands obtained in said first segmentation step; and
    a discrimination step, of discriminating based on a first arithmetic value obtained in said arithmetic step whether to apply said first or second segmentation step to the input moving image data,
    wherein a discrimination in said discrimination step is not performed on the basis of subbands obtained by said second segmentation step.

11. The method according to claim 10, wherein the arithmetic step includes the step of also making the arithmetic process for second subbands obtained in the second segmentation step to output a second arithmetic value.

12. The method according to claim 11, wherein the discrimination step includes the step of discriminating based on the first and second arithmetic values if the first or second segmentation step is applied to the input moving image data.

13. The method according to claim 10, wherein said discrimination step includes the step of discriminating based on a comparison result between the first arithmetic value and a predetermined value whether to apply said first or second segmentation step to the input moving image data.

14. The method according to claim 10, wherein a discrimination result in the discrimination step is generated as identification information.

15. The method according to claim 10, wherein said arithmetic step includes the step of making the arithmetic process of a high-frequency subband obtained after the input moving image data has undergone vertical subband segmentation.

16. The method according to claim 10, wherein the said arithmetic step includes the step of making the arithmetic process of a high-frequency subband obtained after the input moving image data has undergone vertical subband segmentation and horizontal subband segmentation.

17. The method according to claim 10, wherein said arithmetic step includes the step of making the arithmetic process for computing one of an entropy, signal power, and variance of the subband.

18. The method according to claim 10, wherein, when it is determined in said discrimination step that said second segmentation step is applied, vertical subband segmentation in said second segmentation step uses data obtained after horizontal subband segmentation of the input moving image data is executed in said first segmentation step.

19. A computer readable memory that stores a program code of an image process for encoding input moving image data, comprising:
    program code of a first segmentation step, of making subband segmentation of the input moving image data in units of frames using wavelet transformation;
    program code of a second segmentation step, of making subband segmentation of the input moving image data in units of fields using wavelet transformation;
    program code of an arithmetic step, of making an arithmetic process of first subbands obtained in said first segmentation step; and
    program code of a discrimination step, of discriminating based on a first arithmetic value obtained in the arithmetic step whether to apply said first or second segmentation step to the input moving image data,
    wherein a discrimination in said discrimination step is not performed on the basis of subbands obtained by said second segmentation step.

* * * * *